(12) United States Patent
Matsui

(10) Patent No.: US 8,130,308 B2
(45) Date of Patent: Mar. 6, 2012

(54) IMAGE CAPTURE DEVICE CAPABLE OF IMPROVED IMAGE CAPTURING IN ELECTRONIC VIEWFINDER MODE

(75) Inventor: Seiichi Matsui, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 476 days.

(21) Appl. No.: 12/260,582

(22) Filed: Oct. 29, 2008

(65) Prior Publication Data
US 2009/0109316 A1 Apr. 30, 2009

(30) Foreign Application Priority Data

Oct. 31, 2007 (JP) ................................ 2007-283507

(51) Int. Cl.
*H04N 5/222* (2006.01)
*H04N 5/225* (2006.01)
*H04N 5/232* (2006.01)

(52) U.S. Cl. ............... 348/333.01; 348/340; 348/345; 348/371

(58) Field of Classification Search ............ 348/333.01, 348/340, 345, 371, 333.09
See application file for complete search history.

(56) References Cited

U.S. PATENT DOCUMENTS

| 7,711,254 B2* | 5/2010 | Yamasaki ................ 396/55 |
| 7,796,160 B2* | 9/2010 | Ueda et al. ............... 348/211.4 |
| 2007/0153113 A1* | 7/2007 | Ueda et al. ............... 348/335 |

FOREIGN PATENT DOCUMENTS

| JP | 2000-162494 A | 6/2000 |
| JP | 2002-369042 A | 12/2002 |
| JP | 2005-010643 A | 1/2005 |
| JP | 2006-303967 A | 11/2006 |
| JP | 2007-158878 A | 6/2007 |
| JP | 2007-248615 A | 9/2007 |

OTHER PUBLICATIONS

Notice of Reasons for Rejection, dated Nov. 1, 2011, issued in corresponding JP Application No. 2007-283507, 5 pages in English and Japanese.

* cited by examiner

*Primary Examiner* — Lin Ye
*Assistant Examiner* — Amy Hsu
(74) *Attorney, Agent, or Firm* — Sughrue Mion, PLLC

(57) ABSTRACT

The object is to provide an image capture device capable of carrying out good image capture in electronic viewfinder mode. When the electronic viewfinder mode is set in a single lens reflex digital camera a quick return mirror is driven so as to direct light from a photographic subject onto a CCD, and control is also carried out such that images captured by the CCD are displayed as a through image on a liquid crystal monitor at specific time intervals, with the through image display conditions being adjusted so that the image displayed as a through image is an image equivalent to an image that would be captured during main image capture with the set main image capture conditions.

10 Claims, 19 Drawing Sheets

IMAGE CAPTURE DEVICE CAPABLE OF IMPROVED IMAGE CAPTURING IN ELECTRONIC VIEWFINDER MODE

CROSS-REFERENCE TO RELATED APPLICATION

This application claims priority under 35 USC 119 from Japanese Patent Application No. 2007-283507 filed on Oct. 31, 2007.

BACKGROUND

1. Technical Field

The present invention relates to an image capture device, and in particular to a single lens reflex image capture device with an electronic viewfinder mode.

2. Related Art

Single lens reflex digital cameras with exchangeable lenses are generally conventionally configured so as to be able to selectively direct light from a photographic subject to one or other of an optical viewfinder or an image capture element such as a CCD, by use of a quick return mirror, such that light is only guided from the photographic subject to the image capture element when an image is being captured.

There are among such single lens reflex digital cameras those capable of switching between an optical viewfinder mode for confirming the photographic subject with the optical viewfinder, and an electronic viewfinder mode for confirming the photographic subject by displaying on a display such as an LCD a through image of images successively captured by the image capture element. See, for example, Japanese Patent Application Laid-Open (JP-A) Nos. 2002-369042, 2007-158878, and 2000-162494.

A problem arises, however, that in the electronic viewfinder mode there are slight differences between the through image and the actual image during image capture.

In such single lens reflex digital cameras it is usual for light measurement and distance measurement to be carried out by dedicated sensors, as well as it being normal in flash photography for light to be measured at a pre-flash, followed by image capture at a main flash. However, in the electronic viewfinder mode there is the problem that light cannot be measured with the dedicated light measurement sensor, and that light adjustment cannot be carried out in flash photography. Whilst the ability to confirm in advance images captured in flash photography by use of the electronic viewfinder would be extremely useful there are as yet no proposals therefor.

In such conventional single lens reflex digital cameras there is the problem that good image capture is difficult in the electronic viewfinder mode.

SUMMARY

The present invention is one proposing to solve the above problems, and an object thereof is to provide an image capture device capable of good image capture in electronic viewfinder mode.

In order to address the above problems, there is provided an image capture device including:

an optical viewfinder that optically displays incident light from a photographic subject;

an image capture element that captures an image of the photographic subject;

an image capture optical system that focuses the light from the photographic subject onto the image capture element;

a reflection mirror that is provided between the image capture element and the image capture optical system and that directs the light from the photographic subject to either the optical viewfinder or the image capture element;

a display unit that displays the image captured on the image capture element;

an image capture mode switching section that switches between an optical viewfinder mode with photographic subject confirmation with the optical viewfinder and image capture, and an electronic viewfinder mode with photographic subject with a through image displayed on the display unit and image capture;

a control unit that, when the electronic viewfinder mode is set, drives the reflection mirror so that light from the photographic subject is directed onto the image capture element and so that the image captured on the image capture element is displayed on the display unit at a specific interval of time as the through image; and an adjustment unit that adjusts, according to the image capture conditions during through image display, at least one of the through image display conditions during through image display and/or the main image capture conditions during main image capture.

According to the present invention, when an electronic viewfinder mode is set and a through image is displayed on a display unit, adjustment is made according to the image capture conditions during through image display of at least one of the through image display conditions during through image display and/or of the main image capture conditions during main image capture. This thereby enables good image capture of a photographic subject in the electronic viewfinder mode.

The adjustment unit may, for example, adjust the through image display conditions so that an image is displayed as a through image equivalent to an image captured when main image capture is carried out with the set main image capture conditions. An image equivalent to that captured during main image capture can thereby be confirmed in advance in the electronic viewfinder mode.

The adjustment unit may also adjust the through image display conditions according to changed main image capture conditions when the main image capture conditions have been changed. An image equivalent to that during main image capture according to the changed main image capture conditions can thereby be confirmed in advance in the electronic viewfinder mode, even when the main image capture conditions are changed during through image display.

A configuration provided with a flash emission unit that emits light toward the photographic subject may also be employed.

In such a case, when main image capture is instructed during through image display, the adjustment unit may adjust the light emission amount during main light emission of the flash emission unit, based on image data captured without light emission by the flash emission unit and based on image data captured with pre-emission light emission by the flash emission unit. Thereby good flash image capture in electronic viewfinder mode is enabled.

The adjustment unit may also include a generation unit that generates an equivalent image equivalent to an image captured with the flash emission unit emitting light in main image capture. An image equivalent to main image capture with flash emission can thereby be confirmed in advance in the electronic viewfinder mode.

The generation unit can generate the equivalent image based on image data captured without light emission by the flash emission unit in the main image capture conditions and based on image data captured during pre-emission light emission by the flash emission unit.

Configuration may be made such that when the main image capture conditions have been changed the generation unit regenerates the equivalent image according to the changed main image capture conditions. An image equivalent to that during main image capture by flash emission with the changed main image capture conditions can thereby be confirmed in advance, even when the main image capture conditions are changed during through image display.

Configuration may be made to further include a focusing mode switching unit that switches between an auto focus mode in which focusing operation of the photographic subject is carried out automatically and a manual focus mode in which focusing operation of the photographic subject is carried out manually, such that when the electronic viewfinder mode is set the control unit override-switches to the manual focus mode. Thereby, even when the electronic viewfinder mode is set and the auto focus mode is set there is no need to manually switch over to the manual focus mode in order to make a fine adjustment to the focus, enabling an improvement in the ease of use for a user.

The effect is provided according to the present invention of enabling good image capture of a photographic subject in electronic viewfinder mode.

BRIEF DESCRIPTION OF THE DRAWINGS

Exemplary embodiments of the present invention will be described in detail based on the following figures, wherein.

DETAILED DESCRIPTION

Explanation will be given of details of the best mode for realizing the present invention, with reference to the figures.

First Exemplary Embodiment

Figure 1:
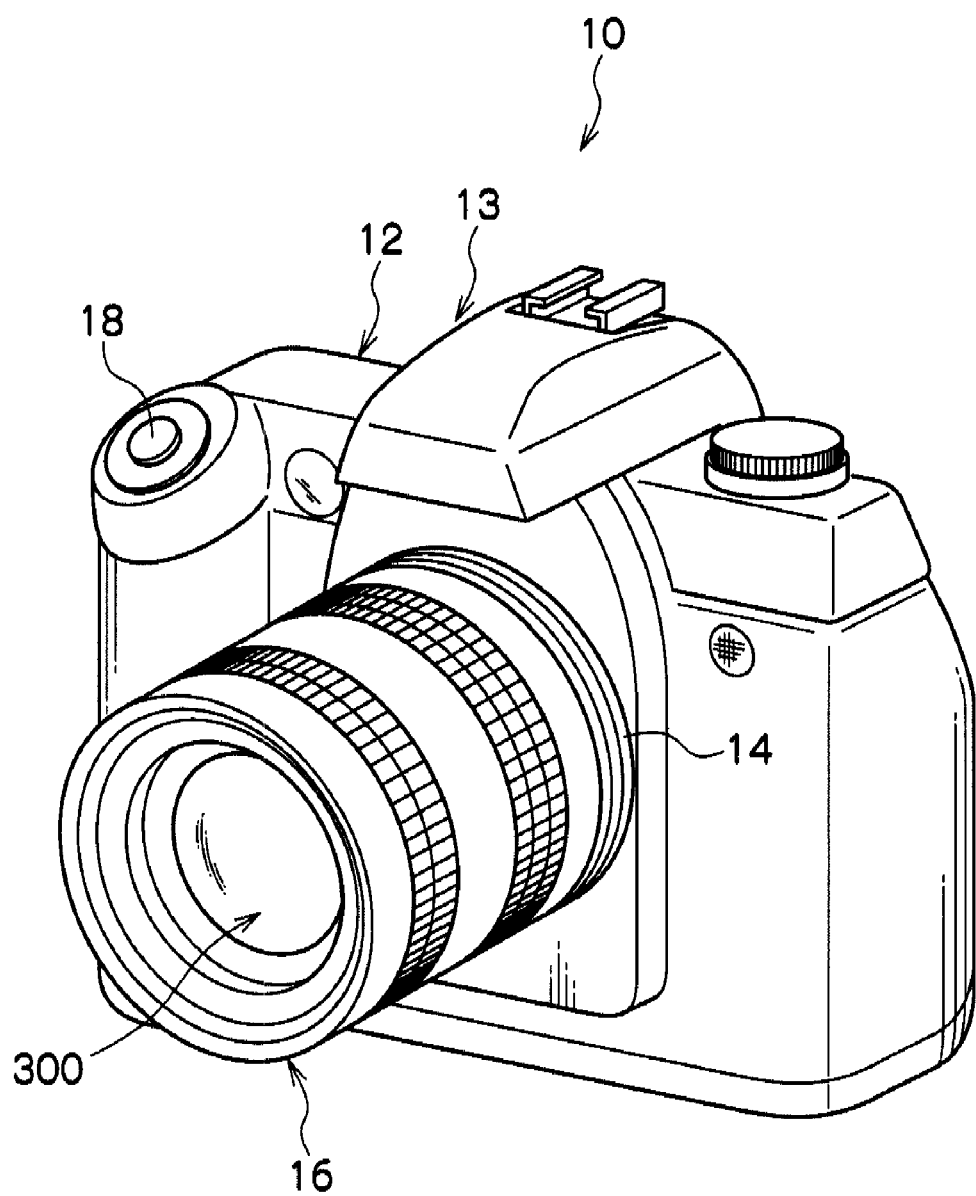
FIG. 1 is a perspective view of a digital camera according to a first exemplary embodiment of the present invention.

Explanation will now be given of a digital camera according to the first exemplary embodiment of the present invention. As shown in FIG. 1, a digital camera 10 is a steel single lens reflex digital camera.

Figure 2:
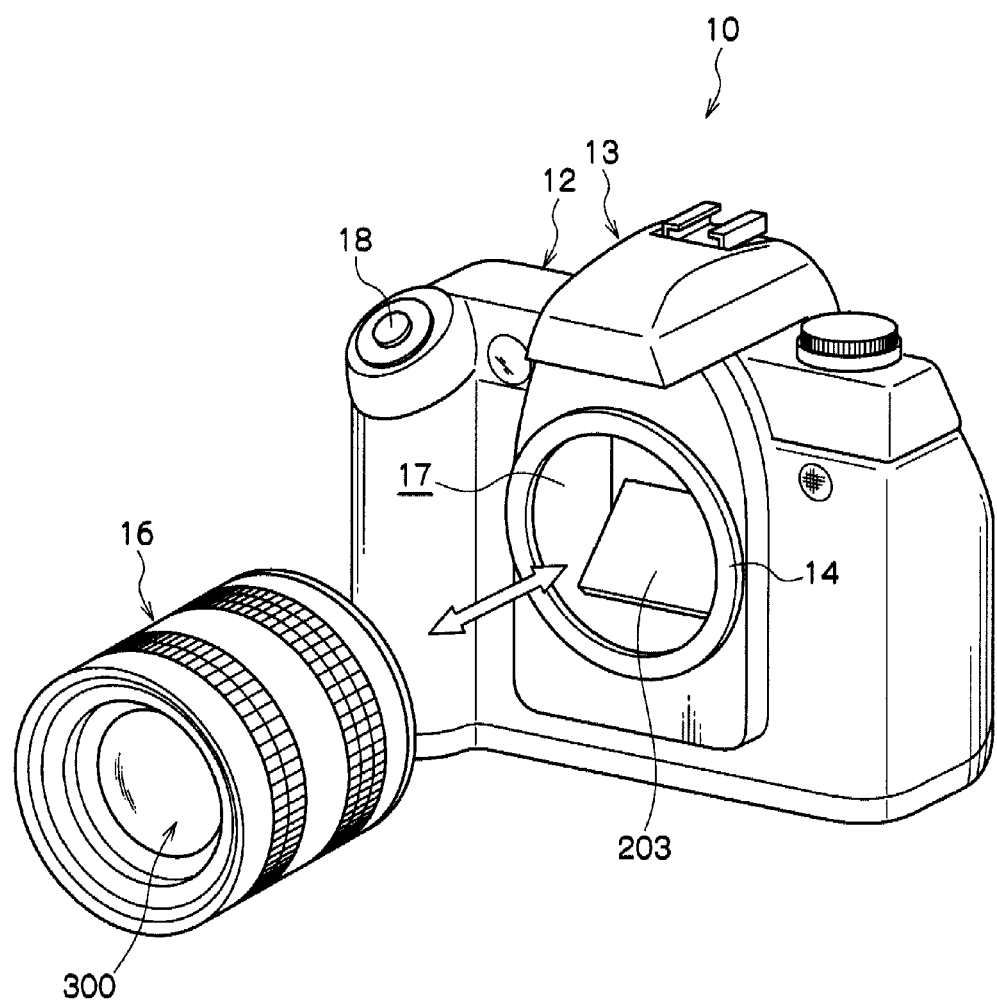
FIG. 2 is a perspective view of a digital camera with lens unit detached.

The digital camera 10, as shown in FIGS. 1 and 2, includes a lens mount portion 14 provided to a front face portion of a camera body 12. A lens unit 16, provided with a lens set 300 (see FIG. 4) made up from plural lenses, is exchangeably mounted via the lens mount portion 14. There is also a shutter button 18 disposed when facing the front face at a top left portion thereof. There is also a flash 13 for emitting auxiliary light provided at a central portion when facing the front face. The flash 13 is configured so as to automatically pop up and emit a flash during image capturing when image capture by flash emission is set. In FIGS. 1 and 2 the flash 13 is shown in the closed state. Setting flash emission may also be undertaken by manually popping up the flash 13 so that a flash will be emitted.

Figure 3:
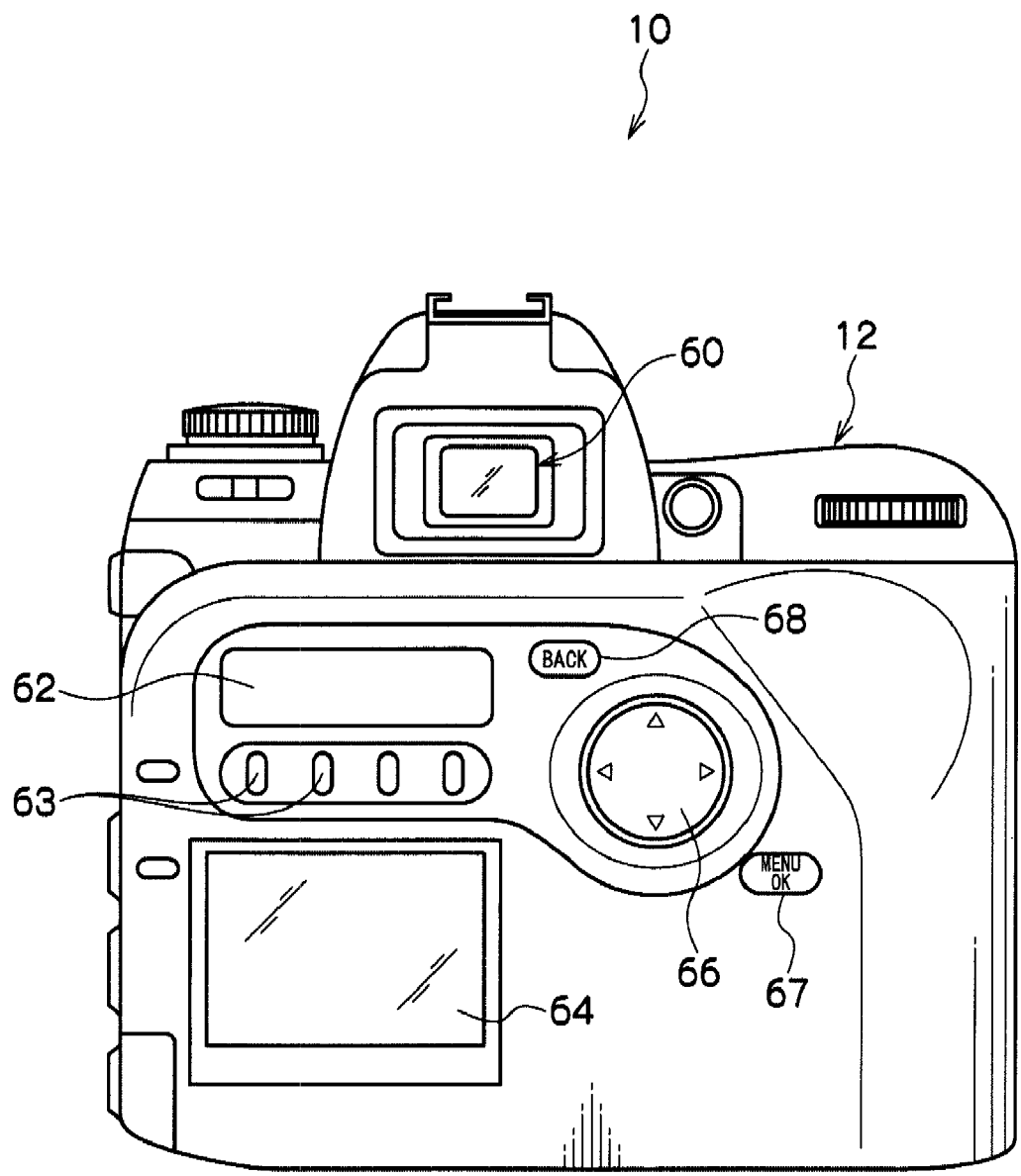
FIG. 3 is a diagram showing the back face of a digital camera according to the first exemplary embodiment.

On the back face of the external case of the digital camera 10 there are provided, as shown in FIG. 3, an optical viewfinder 60, a display panel 62, a liquid crystal monitor 64, a cross button 66, a menu/execution button 67, a back button 68, and function buttons 63.

The photographic subject and reproduced images of previously stored images are displayed on the liquid crystal monitor 64. Information of the image capture mode that is currently set, information on the image compression ratio, date and time information, frame number etc. is also displayed thereon. The liquid crystal monitor 64 is also used as a user interface display screen when a user carries out various setting operations, and displays menu information such as setting options as required.

A photographer is able to view the photographic subject as from the lens unit 16 (see FIGS. 1 and 2) using the optical viewfinder 60.

Figure 4:
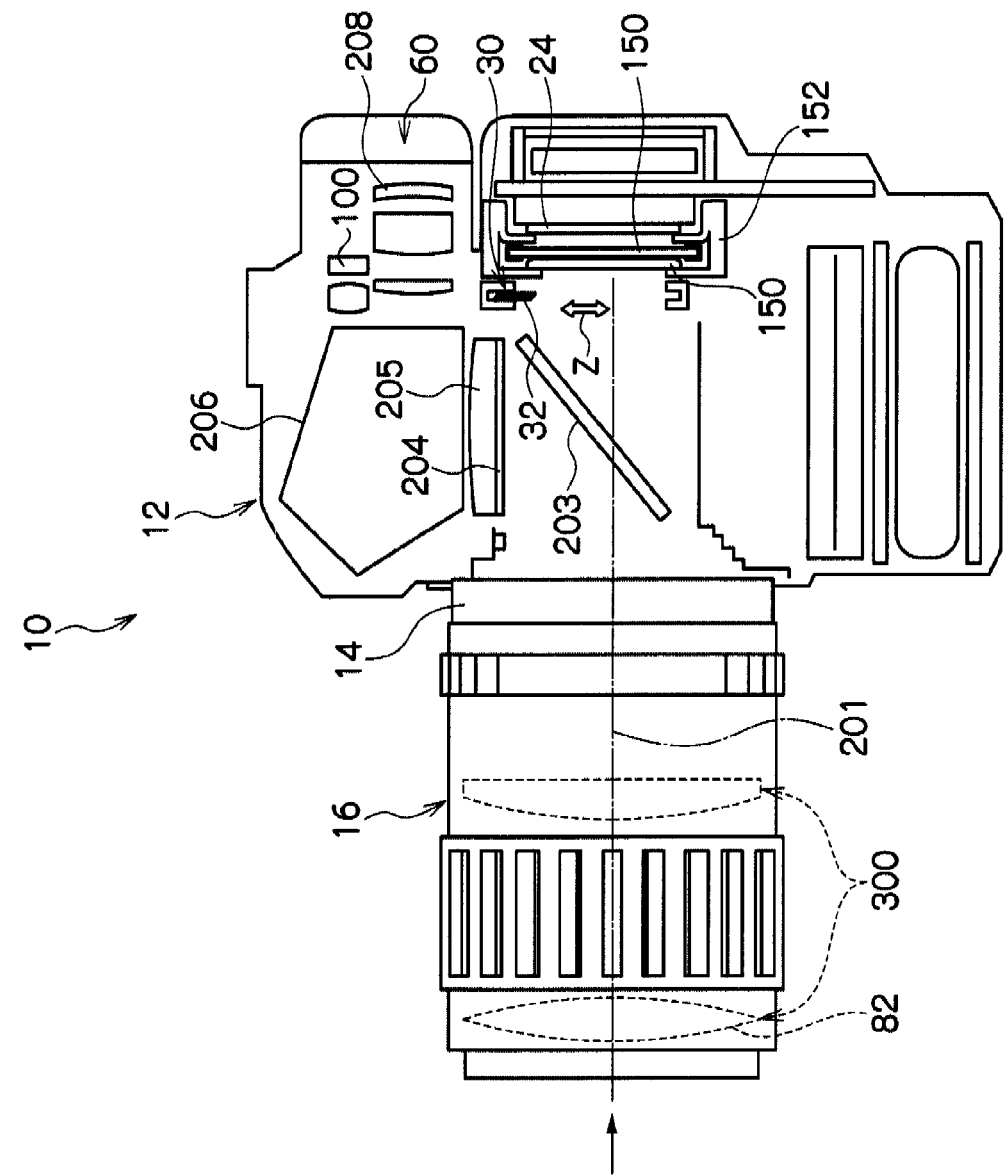
FIG. 4 is a diagram schematically showing the interior of a digital camera according to the first exemplary embodiment.

There is a quick return mirror 203 provided on the image capture optical path within the camera body 12, as shown in FIG. 4. The quick return mirror 203 moves between a position in which light from the photographic subject is directed along the optical path system to the optical viewfinder 60 (angled position) and a position removed from the photographic optical path (removed position) (namely placed mirror down and mirror up). The quick return mirror 203 in FIG. 4 has been placed mirror down and is in the angled position. The intermittent line with a single dot indicates an optical axis 201.

There is a focusing plate 204 disposed above the quick return mirror 203 for directing photographic subject light to the optical viewfinder 60 and focusing thereon. A condenser lens 205 is provided above the focusing plate 204 to raise the visibility of the optical viewfinder 60. Apentagonal roof prism 206 directs photographic subject light that has passed through the focusing plate 204 and the condenser lens 205 onto an eye lens 208 used in the optical viewfinder 60.

There is a focal plane shutter-type shutter mechanism 30 disposed behind the quick return mirror 203, opening and closing a shutter 32 along the up-down direction (direction of arrow Z). The shutter 32 is shown in the open state in FIG. 4. There is an image capture element of a CCD 22 disposed behind the shutter mechanism 30. The CCD 22 is configured with plural photodiodes (omitted in the figures) arrayed in a flat plane honeycomb array, with a pair array or other specific color filter array structure. There is a cover glass 24 disposed at the front face of the CCD 22, and there is an optical low pass filter 150 (referred to below as OLPF 150) disposed further in front thereof to remove high frequency components of light in order to prevent generation of Moire effects.

The shutter 32 opens after the quick return mirror 203 has been placed mirror up and removed from the image capture optical path (removed position), and charge is accumulated in the CCD 22 through the OLPF 150. Image data is then stored on a storage medium 120 (see FIG. 5).

Figure 5:
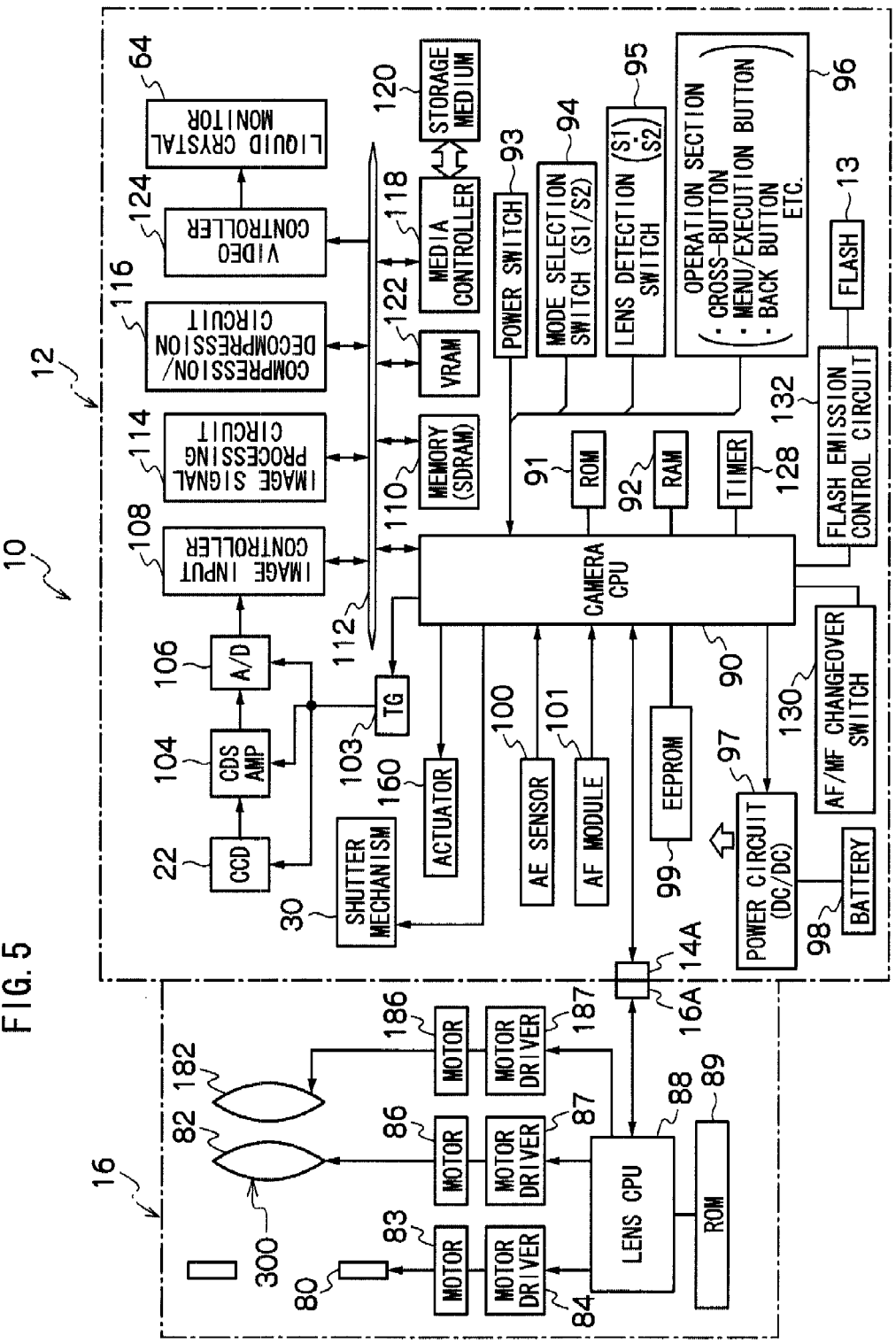
FIG. 5 is a block diagram of a digital camera according to the first exemplary embodiment.

FIG. 5 is a block diagram showing the internal configuration of the digital camera 10 (the camera body 12 and the lens unit 16). The lens unit 16 is provided with an aperture mechanism 80 and a lens group 300 of a focusing lens 82, a zoom lens 182 etc. Also provided are: an iris motor 83 as a portion for driving the aperture mechanism 80 and a driving circuit thereof (motor driver) 84; an AF motor 86 as a portion for driving the focusing lens 82 and a driving circuit thereof (motor driver) 87; a zoom motor 186 as a portion for driving the zoom lens 182 and a driving circuit thereof (motor driver) 187; a central processing unit for control (referred to below as lens CPU) 88; and a ROM 89 storing various types of data. It should be noted that the zoom may be manually driven. The driving of the aperture and AF may also be configured so as to be driven from the camera body 12.

The non-volatile memory of the ROM 89 may be a non-rewritable memory, or a rewritable memory such as EEPROM. Various information such as the name of the type of lens unit 16, the focal distance, the F number, and various other lens properties (referred to below as "lens information") is stored on the ROM 89.

The lens unit 16 is electrically connected to the camera body 12 through an electrical connection portion 14A provided on the lens mount portion 14 and through an electrical connection portion 16A provided on the lens unit 16 when the lens unit 16 is mounted to the lens mount portion 14 of the camera body 12 (see FIGS. 1 and 2), and signal exchange becomes possible between a CPU (referred to below as camera CPU) 90 within the digital camera 10 and the lens CPU 88.

The camera CPU 90 functions as a controller for carrying out overall control of the main camera system according to a specific program, as well as functioning as a computation unit for executing various types of computations, such as AE/AF computations. The program executed in the camera CPU 90 and various data required for control are stored in a ROM 91 connected to the camera CPU 90, and a RAM 92 is used as a working area for the camera CPU 90. The non-volatile memory of the ROM 91 may also be replaced with a non-rewritable memory, or with a rewritable memory such as EEPROM.

The camera CPU 90 controls the operation of each of the circuits within the digital camera 10 according to a power switch 93, a mode selection switch 94, a lens detection switch 95, and instruction signals from an operation section 96 that are provided in the camera body 12. The operation section 96 is a block including various operation portions such as the cross button 66, the menu/execution button 67, the back button 68, the function buttons 63, etc. shown in FIG. 3.

There is an AF/MF changeover switch 130 connected to the camera CPU 90, for switching between an autofocus mode for automatic focusing driving and a manual focusing mode for manual focusing driving.

The power switch 93 is an operation portion for switching the main power of the digital camera 10 ON/OFF. The camera CPU 90 monitors the state of the power switch 93 and controls a power circuit 97 according to the state thereof. Namely, when a closed (ON) state of the power switch 93 is detected the camera CPU 90 gives a start up instruction signal to the power circuit 97 and starts up the power circuit 97.

The power circuit 97 includes a DC/DC convertor. After power supplied from a battery 98 housed in the digital camera 10 has been converted into the desired voltage, this power is then supplied to the various circuit blocks within the digital camera 10. When an open state (OFF) of the power switch 93 is detected the camera CPU 90 gives a shut down instruction signal to the power circuit 97, stopping power supply from the power circuit 97. It should be noted that ON/OFF of the main power source is not limited to operation by the power switch 93, and there is the functionality for switching using an auto power ON function (a function for putting the power ON at a set time) and an auto power OFF function (a function for automatically turning the power OFF when a set duration of non-operation has continued, or at a set time).

The mode selection switch 94 is a portion for setting the operation mode of the digital camera 10, and each mode, such as "image capture mode" (mode for carrying out image capture), "reproduction mode" (mode for reproducing stored images), etc. can be set by operation of the mode selection switch 94. The release detection switch 95 is a detection switch disposed within the shutter button 18 (see FIG. 1) and is configured from an S1 switch that is ON when the shutter button 18 is depressed partway, and an S2 switch that is ON when the shutter button 18 is depressed fully.

The digital camera 10 enters a state capable of image capture when the "image capture mode" is selected by the mode selection switch 94. When the camera CPU 90 detects that the shutter button 18 has been depressed partway (S1=ON) the AE and AF processing is executed, and then when it is detected that the shutter button 18 has been fully depressed (S2=ON) control is initiated of CCD exposure for reading in an image for storage.

The AE function installed in the digital camera 10 is a TTL type of AE, with an AE sensor (light receiving element) 100 provided as a detection system within the digital camera 10 near to the optical viewfinder 60. This AE sensor 100 is configured such that when the quick return mirror 203 is in the mirror down state the photographic subject light reflected at the quick return mirror 203 is directed by the optical system of the pentagonal roof prism 206 etc. to the AE sensor 100.

The AF function of the digital camera 10 is a TTL phase difference detection type of AF, and there is an AF module 101 and an optical system (not shown in the figures) as required for forming the optical path. There are no particular limitations to the disposition configuration and optical system of the AF module 101 in the exemplary embodiment of the present invention, and various types of known AF module for single lens reflex cameras can be employed. In addition the execution of the AE/AF functions is not limited to the example described above and other methods of AE/AF may also be adopted.

The camera CPU 90 also controls an actuator 160 for switching the quick return mirror 203 between the angled position and the removed position, and a flash emission control circuit 132 for controlling flash emission by the flash 13.

The camera CPU 90 determines the focal state when the shutter button 18 is "partway depressed" (S1=ON), based on a detection signal output from the AF module 101, and generates a movement control signal for the focusing lens 82. This movement control signal is sent to the lens CPU 88. The lens CPU 88 controls the motor driver 87 and operates the AF motor 86 based on the signal from the camera CPU 90, and moves the focusing lens 82 to the focal position.

The camera CPU 90 carries out AE computation based on the detection signal from the AE sensor 100, and outputs a computed aperture number and shutter speed.

The camera CPU 90 controls the actuator 160 when the shutter button 18 is "fully depressed" (S2=ON) and switches the quick return mirror 203 to the removed position, sends an aperture control signal based on the results of AE computation to the lens CPU 88, controls the shutter mechanism 30 (see FIG. 4), and as well as operating the opening and closing of the shutter 32 of the shutter mechanism 30 the camera CPU 90 also controls the charge accumulation duration of the CCD 22. Based on signals from the camera CPU 90 the lens CPU 88 controls the motor driver 84, operates the iris motor 83, and sets the desired aperture for the aperture mechanism 80. It should be noted that when image capture with flash emission is set then the flash 13 is popped up and flash emission is carried out with image capture. The optical image of the photographic subject that is focused on the CCD 22 through the lens unit 16 is photoelectric-converted by the CCD 22.

The accumulated signal charges in each of the photo diodes (omitted in the figures) of the CCD 22 are sequentially read out as a voltage signal (image capture signal) corresponding to the signal charge in response to a pulse applied from a timing generator (TG) 103. The signal output from the CCD 22 is sent to an analog processing section 104 and desired processing applied thereto, such as correlated double sampling (CDS) processing, color separation, gain adjustment etc. The image signal generated in the analog processing section 104 is converted into a digital signal by an A/D convertor 106 and then stored in a memory 110 via an image input controller 108. The timing generator 103 applies a timing signal to the analog processing section 104 and the A/D convertor 106 according to instructions of the camera CPU 90, and each of the circuits is synchronized by this timing signal.

Data stored in the memory 110 is sent to an image signal processing circuit 114 through a bus 112. The image signal processing circuit 114 is an image processing section including a luminance/color difference signal generating circuit, a gamma correction circuit, a sharpness correction circuit, a whiteness balance correction circuit, and a gain (sensitivity) adjustment circuit etc. The image signal processing circuit 114 processes the image signal according to commands from the camera CPU 90.

Image data that has been input to the image signal processing circuit 114 is converted into a luminance signal (Y signal) and a color difference signal (Cr, Cb signal), and specific processing, such as gamma correction, gain adjustment etc. is also carried out thereto. The image data generated by the image signal processing circuit 114 is sent to a compression/decompression circuit 116 where it is compressed according to a specific format of JPEG or another format. The compressed image data is stored on the storage medium 120 via a media controller 118.

The compression format is not limited to JPEG, and MPEG or other formats may be used. The section in which the image data is held is not limited to semiconductor memories typified by memory cards, and various media may be employed such as magnetic disks, optical disks, magneto optical disks etc. There is also no limitation to removable media and a storage medium (such as an internal memory) installed within the digital camera 10 may also be used.

When the "reproduction mode" is selected by the mode selection switch 94 an image file is read out from the storage medium 120. The read-out data is decompressed by the compression/decompression circuit 116 and sent to a VRAM 122. The data stored in the VRAM 122 is converted into a specific type of signal used for display (such as NTSC type color composite signal), which is then supplied to the liquid crystal monitor 64. Images stored on such a storage medium 120 are displayed in this manner on the liquid crystal monitor 64.

By operation of the operation section 96, the digital camera 10 is also switchable between image capture modes of an optical viewfinder mode, in which image capture is possible with the quick return mirror 203 in the angled position while visually confirming the photographic subject by use of the optical viewfinder 60, and an electronic viewfinder mode, in which image capture is possible with the quick return mirror 203 in the removed position while visually confirming the photographic subject by use of a photographic subject image (through image) displayed on the liquid crystal monitor 64 with the shutter 32 open and the photographic subject focused on the CCD 22, the image thereof being displayed with a specific periodicy on the liquid crystal monitor 64.

Explanation will now be given of the operation of the present exemplary embodiment in relation to the image capture processing executed by the digital camera 10.

Figure 6:
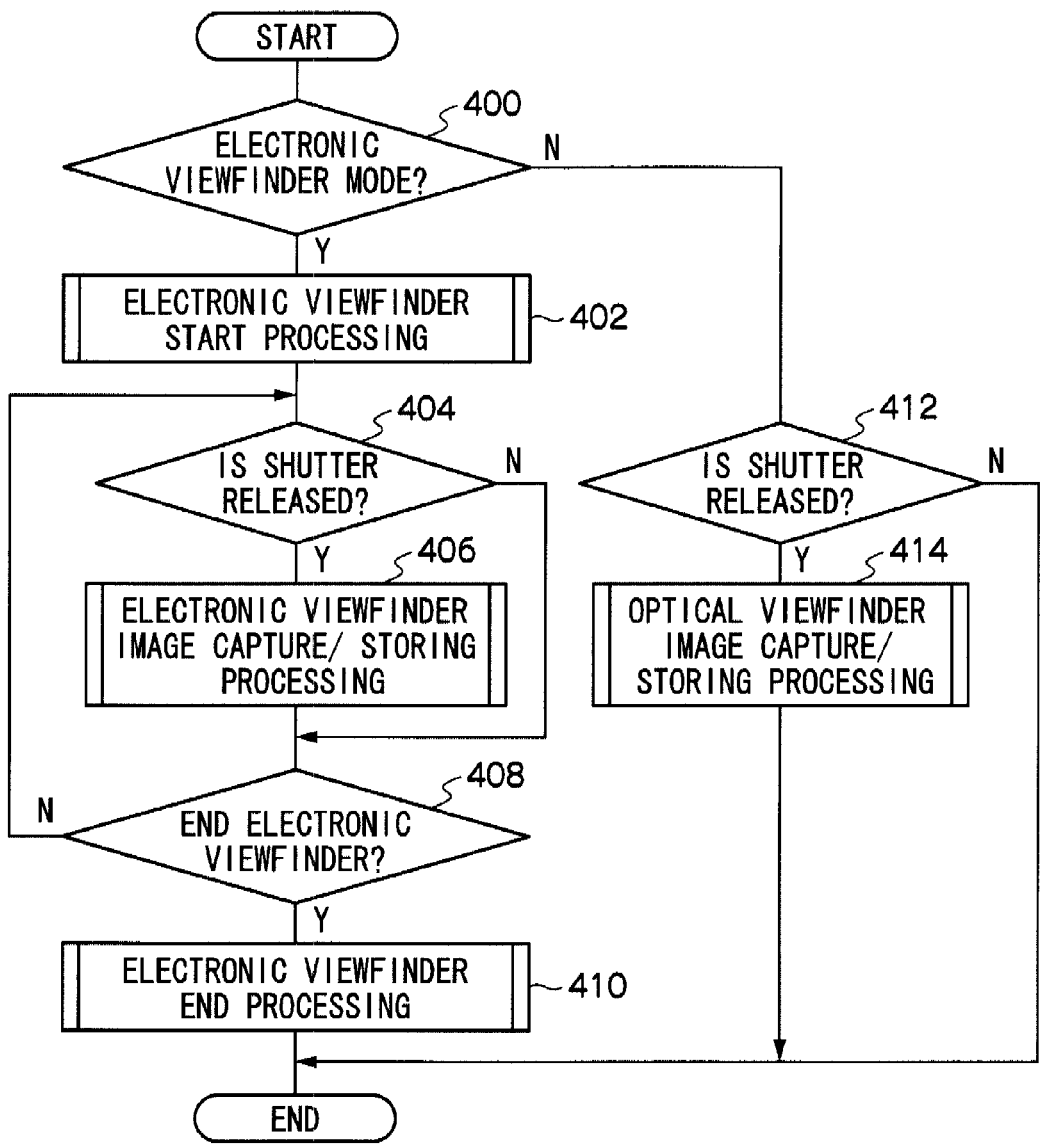
FIG. 6 is a flow chart of image capture processing according to the first exemplary embodiment.

A flow chart of the image capture processing executed in the image capture mode is shown in FIG. 6. The image capture processing shown in FIG. 6 is executed at specific intervals when the "image capture mode" is selected by the mode selection switch 94.

First, at step 400, determination is made as to whether or not the electronic viewfinder mode is selected as the image capture mode. The routine proceeds to step 402 when the electronic viewfinder mode is selected, and proceeds to step 412 when the optical viewfinder mode is set.

Figure 7:
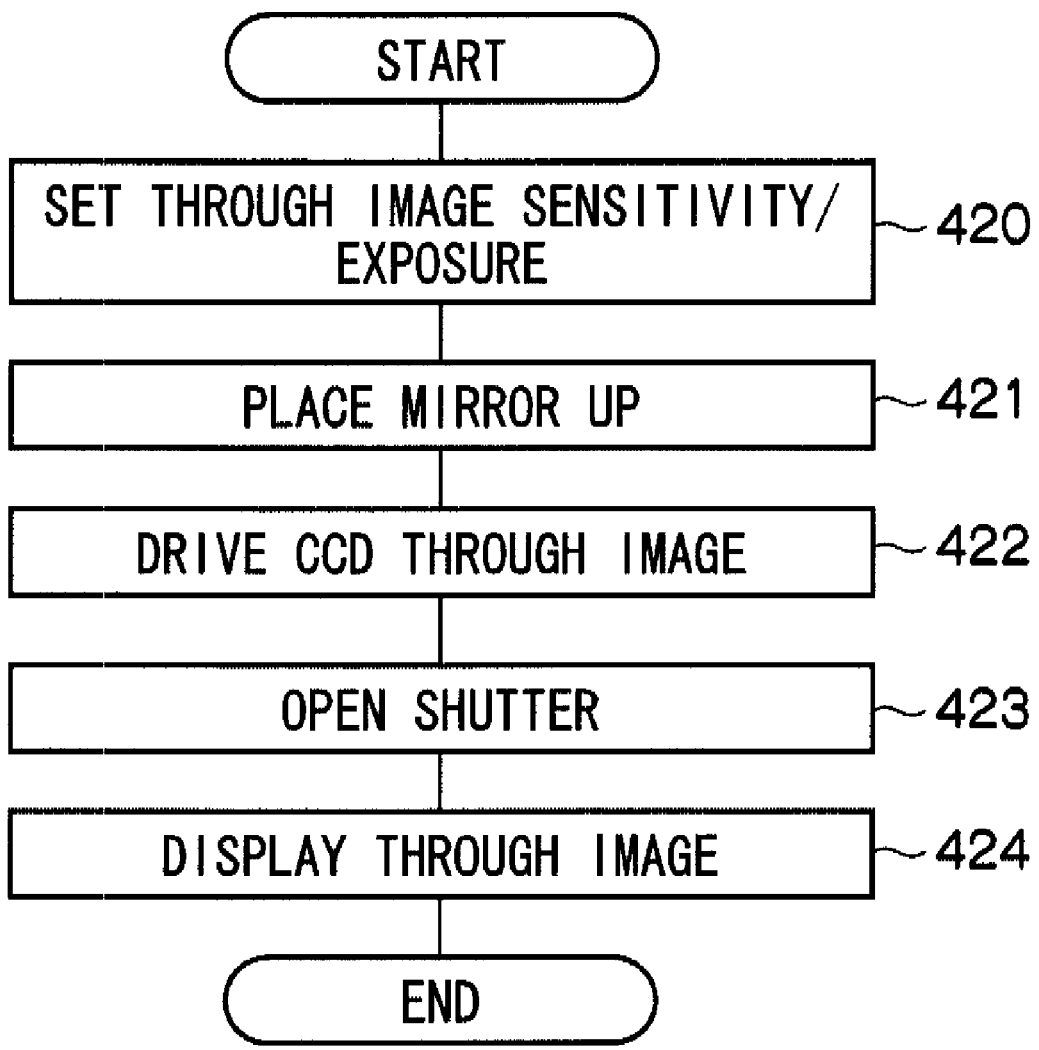
FIG. 7 is a flow chart of electronic viewfinder start processing according to the first exemplary embodiment.

At step 402 electronic viewfinder start processing is executed as shown in FIG. 7. First the conditions (through image conditions) are set relating to the sensitivity and exposure of the photographic subject displayed at a specific periodicity on the liquid crystal monitor 64, namely of the through image. In the present exemplary embodiment, for example, the through image display conditions are set such that an equivalent image is displayed on the liquid crystal monitor 64 to that which would be captured during main image capture with the conditions that have been set in advance relating to the sensitivity and exposure of the photographic subject (main image capture conditions) by user operation and by AE light measurement etc. Namely the through image display conditions are set such that the brightness and photographic subject field depth for the through image displayed on the liquid crystal monitor 64 is equivalent to the brightness and photographic subject field depth during main image capture. The conditions related to exposure here refer to the aperture number and shutter speed.

Specifically the through image sensitivity, aperture number and shutter speed are set as follows when $Tv \leqq Tv\_c$, namely when the shutter speed during main image capture is shorter than the periodicity of through image read-out. In the following equations: the image capture sensitivity during main image capture is Sv; the aperture number during main image capture is Av; the shutter speed during main image capture is Tv; the sensitivity of the through image is Sv_m; the aperture number of the through image is Av_m; the exposure duration of the through image is Tv_m; and the periodicity of read-out of the through image is Tv_c.

$$Sv\_m=Sv, Av\_m=Av, \text{ and } Tv\_m=Tv$$

Namely, when the shutter speed during main image capture is shorter than the periodicity of through image read-out, the sensitivity, aperture number and shutter speed of the through image are the same as the sensitivity, aperture number and shutter speed during main image capture.

On the other hands, when Tv>Tv_c, namely when the shutter speed during main image capture is slower than the periodicity of through image read-out, then the sensitivity, aperture number and shutter speed of the through image are set as follows.

$$Sv\_m=Sv+(Tv-Tv\_c), Av\_m=Av, Tv\_m=Tv\_c$$

Namely, when the shutter speed during main image capture is slower than the periodicity of through image read-out, then the sensitivity is set by adding in the difference of the through image read-out periodicity subtracted from the shutter speed during main image capture, that is adding in the shortfall to the shutter speed. The through image brightness can thereby be made equivalent to the brightness during main image capture.

The aperture number of the through image is set the same as the aperture number during main image capture, and the exposure duration of the through image is set the same as the read-out periodicity of the through image.

By setting the conditions relating the sensitivity and exposure of the through image as described above, the display of the through image can be made with brightness and photographic subject field depth equivalent to that during main image capture. Consequentially a user can confirm in advance with the liquid crystal monitor 64 an image of equivalent brightness and photographic subject field depth to that during main image capture, enabling good image capture of a photographic subject.

Then, in step 421, the actuator 160 is driven and the quick return mirror 203 is placed mirror up.

In step 422, the CCD 22 is driven with the periodicity necessary to display an image focused at the CCD 22 with a specific periodicity on the liquid crystal monitor 64 as a through image.

In step 423, the shutter mechanism 30 is driven and the shutter 32 is opened. The incident photographic subject image is thereby focused onto the CCD 22.

In step 424, the CCD 22, the aperture mechanism 80, the liquid crystal monitor 64 etc. are driven such that a through image is displayed according to the conditions set as described above.

In step 404 of FIG. 6, determination is made as to whether or not the shutter has been released, namely whether or not the shutter button 18 has been fully depressed. When the shutter has been released the routine proceeds to step 406, and when the shutter has not be released the routine proceeds to step 408.

Figure 8:
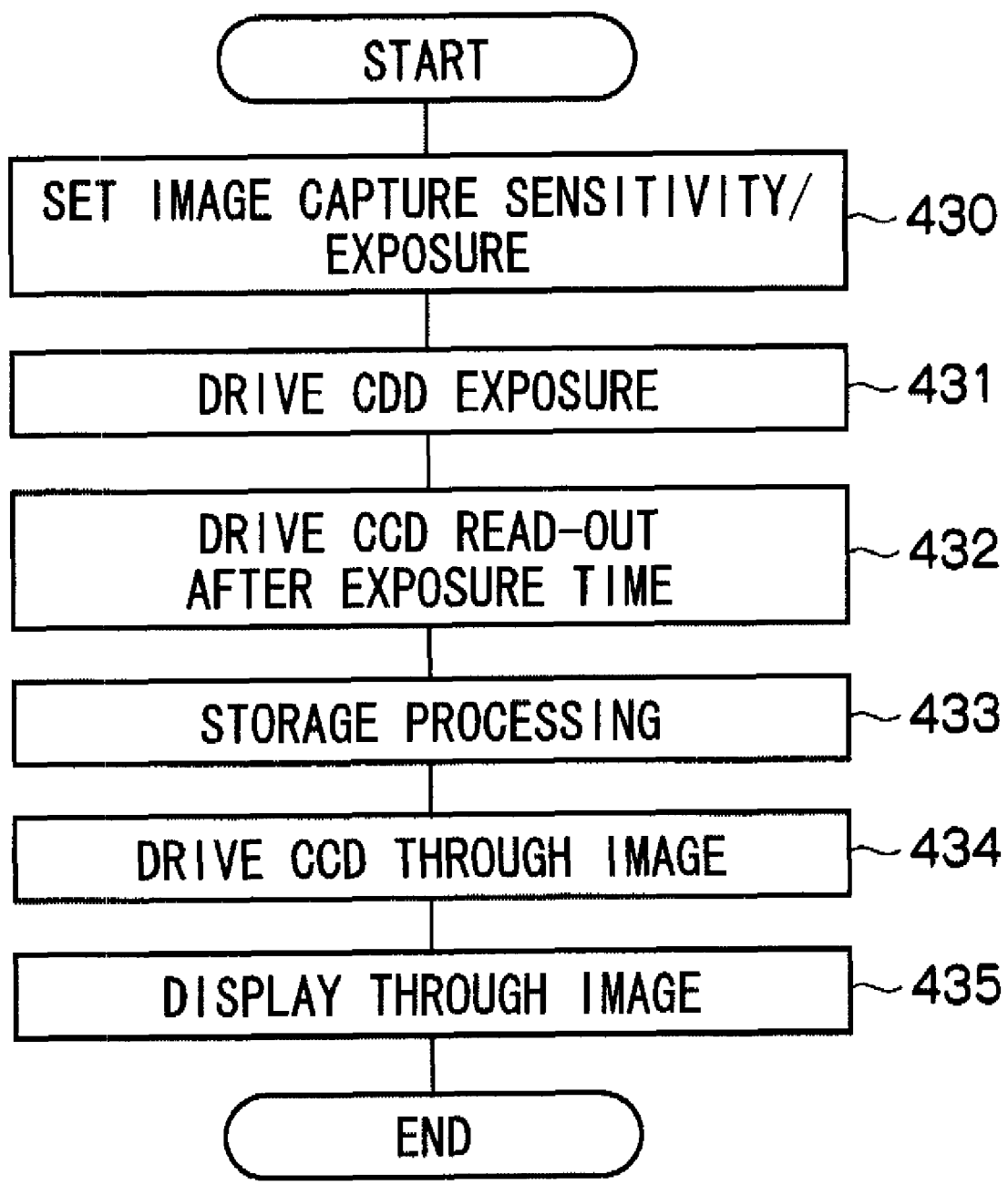
FIG. 8 is a flow chart of electronic viewfinder image capture/storing processing according to the first exemplary embodiment.

In step 406, electronic viewfinder image capture/storing processing is executed like that shown in FIG. 8. In step 430 shown in FIG. 8, the main image capture conditions relating to the sensitivity and exposure during main image capture, namely, for example, the sensitivity, aperture number and shutter speed set in advance such as by user operation, are set. Specifically, the sensitivity is set for the image signal processing circuit 114 for carrying out gain adjustment, the aperture number is set for the aperture mechanism 80 through the lens CPU 88, and the shutter speed is set for the shutter mechanism 30.

When, for example, the set shutter speed is a high speed, then image capture may be made with the shutter 32 left open and the exposure duration to the CCD 22 controlled, namely an electronic shutter may be used. In such cases, the exposure duration for the CCD 22 may be set to correspond to the set shutter speed. Also image capture in electronic viewfinder mode may be set to always be image capture with the electronic viewfinder, independent of how high or low the shutter speed is.

In step 431, the CCD 22 is driven, and in step 432 the charge that has accumulated in the CCD 22 after the set exposure time is read out as an image capture signal.

In step 433, specific processing as described above is successively carried out to the read-out image capture signal, and stored as image data in the storage medium 120.

In step 434, the CCD 22 is driven in the manner required to display the image focused on the CCD 22 with a specific periodicity on the liquid crystal monitor 64 as a through image.

In step 435, the CCD 22, the aperture mechanism 80, the liquid crystal monitor 64 etc. are driven so as to display a through image according to the conditions set as described above and the routine returns.

Processing to close the shutter 32 and/or processing to place the quick return mirror 203 in the mirror down position may be executed between step 432 and step 433. By so doing, incident light can be prevented from reaching the CCD 22 and smear generation of the image when image capturing with an electronic shutter can be prevented. The photographic subject can also be quickly confirmed with the optical viewfinder 60 when the quick return mirror 203 is placed mirror down.

If processing to close the shutter 32 and/or processing to place the quick return mirror 203 in the mirror down position is executed, then corresponding processing to open the shutter 32 and/or processing to place the quick return mirror 203 in the mirror up position is executed between step 434 and step 435. Continuous through image display is thereby made possible.

In step 408 of FIG. 6, determination is made as to whether or not operation has been made by the user to end the electronic viewfinder mode. When operation to end the electronic viewfinder mode has been made the routine proceeds to step 410, and when the operation to end the electronic viewfinder mode has not been made the routine returns to step 404 and the same processing to that described above is repeated.

Figure 9:
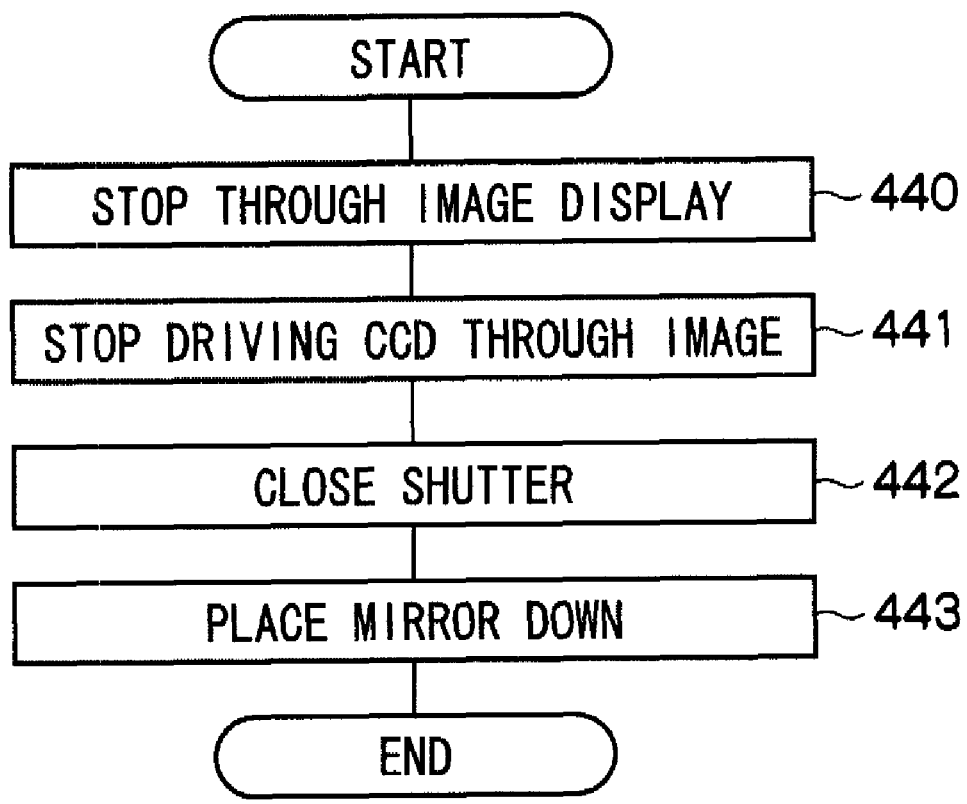
FIG. 9 is a flow chart of electronic viewfinder end processing.

In step 410, electronic viewfinder end processing like that shown in FIG. 9 is executed. In step 440 shown in FIG. 9, instruction is given to the liquid crystal monitor 64 to stop through image display and through image display is stopped.

Instruction is made to the CCD 22 in step 441 to stop through image driving, and through image driving is stopped. Instruction is made to the shutter mechanism 30 in step 442 to close the shutter 32 and the shutter 32 is closed.

In step 443, the actuator 160 is driven so as to return the quick return mirror 203 to the mirror down position. After the quick return mirror 203 has been placed mirror down the aperture may be opened.

When determination is negative at step 400 of FIG. 6, namely determination is that the optical viewfinder mode is selected as the image capture mode, determination is made at step 412 as to whether or not the shutter has been released, namely whether or not the shutter button 18 has been depressed fully. When the shutter has been released the routine proceeds to step 414, and when the shutter has not been released the present routine is ended.

Figure 10:
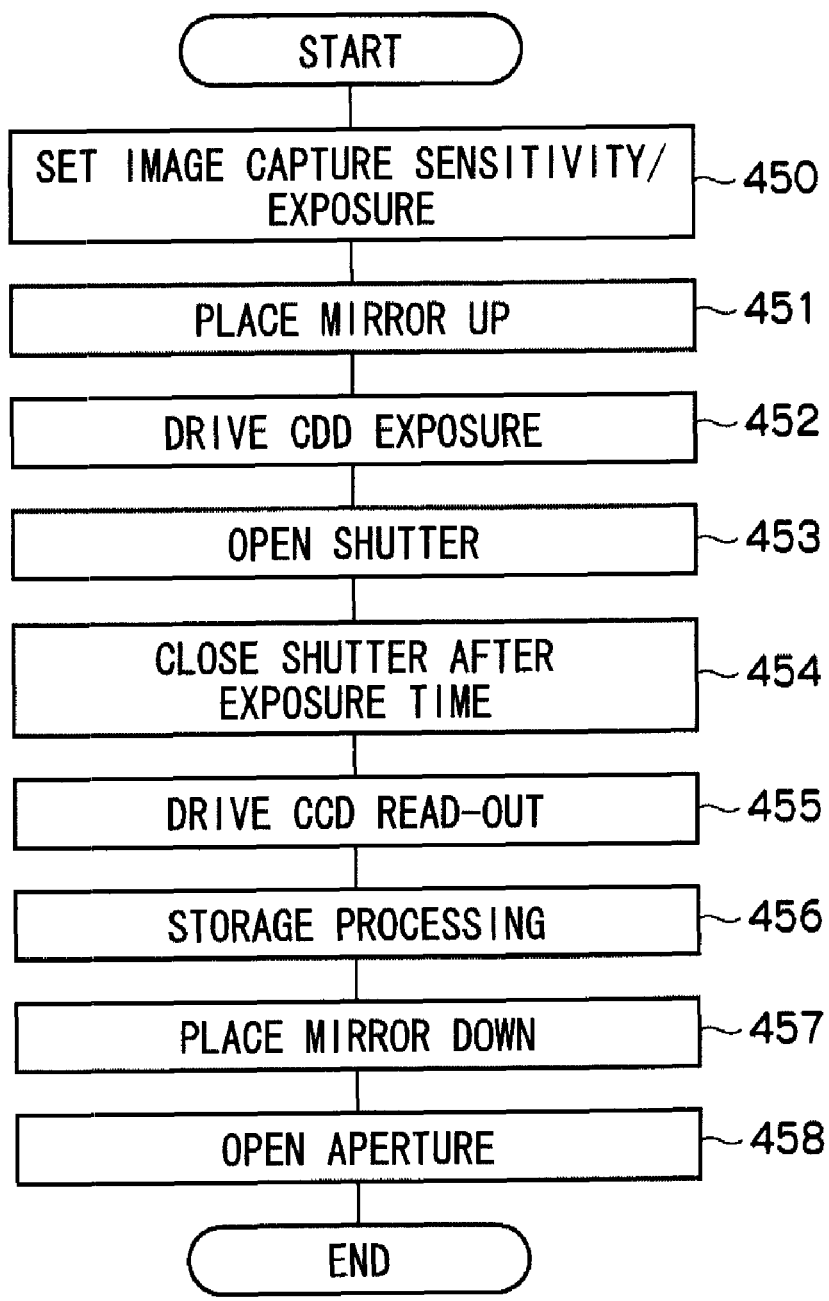
FIG. 10 is a flow chart of optical viewfinder image capture/storing processing according to the first exemplary embodiment.

In step 414 optical viewfinder image capture/storing processing like that shown in FIG. 10 is executed. In step 450 shown in FIG. 10, the main image capture conditions related to the sensitivity and exposure during main image capture are set, namely the sensitivity, aperture number and shutter speed set in advance, for example by user operation, by AE light measurements etc are set. Specifically the sensitivity is set for the image signal processing circuit 114 for carrying out gain adjustment, the aperture number is set for the aperture mechanism 80 through the lens CPU 88, and the shutter speed is set for the shutter mechanism 30.

In step 451, the actuator 160 is driven and the quick return mirror 203 is placed mirror up.

In step 452, the CCD 22 is driven and in step 453 the shutter mechanism 30 is driven and the shutter 32 is opened.

In step 454, the shutter mechanism 30 is driven and the shutter 32 is closed after the set exposure duration has elapsed. Control is carried out so that the opening and closing of the shutter 32 is with the set shutter speed. When, for example, the set shutter speed is a high speed then the exposure duration may be controlled using the slit separation of the leading and trailing curtains, used in combination with an electronic shutter.

In step 455, the charge that has accumulated in the CCD 22 is read out as an image capture signal. In step 456, specific processing described above is successively preformed on the read-out image capture signal, and image data is stored on the storage medium 120.

In step 457, the actuator 160 is driven and the quick return mirror 203 is placed mirror down.

In step 458, instruction is given to the lens CPU 88 to open the aperture. Consequently the lens CPU 88 drives the aperture mechanism 80 opens the aperture and the routine returns.

Thereby, in the electronic viewfinder mode in the present exemplary embodiment, by setting the conditions relating the sensitivity and exposure of the through image to be equivalent to those during main image capture, display of the through image can be made with the brightness and photographic subject field depth to that during main image capture. Consequentially a user can confirm in advance with the liquid crystal monitor 64 an image of equivalent brightness and photographic subject field depth to that during main image capture, enabling good image capture of a photographic subject.

Second Exemplary Embodiment

Explanation will next be given of a second exemplary embodiment of present invention. In the second exemplary embodiment, explanation will be made regarding when the settings of the sensitivity and exposure are changed by user operation in the electric viewfinder mode. Those portions that are similar to those of the first exemplary embodiment are allocated the same reference numerals and detailed explanation thereof is omitted.

Figure 11:
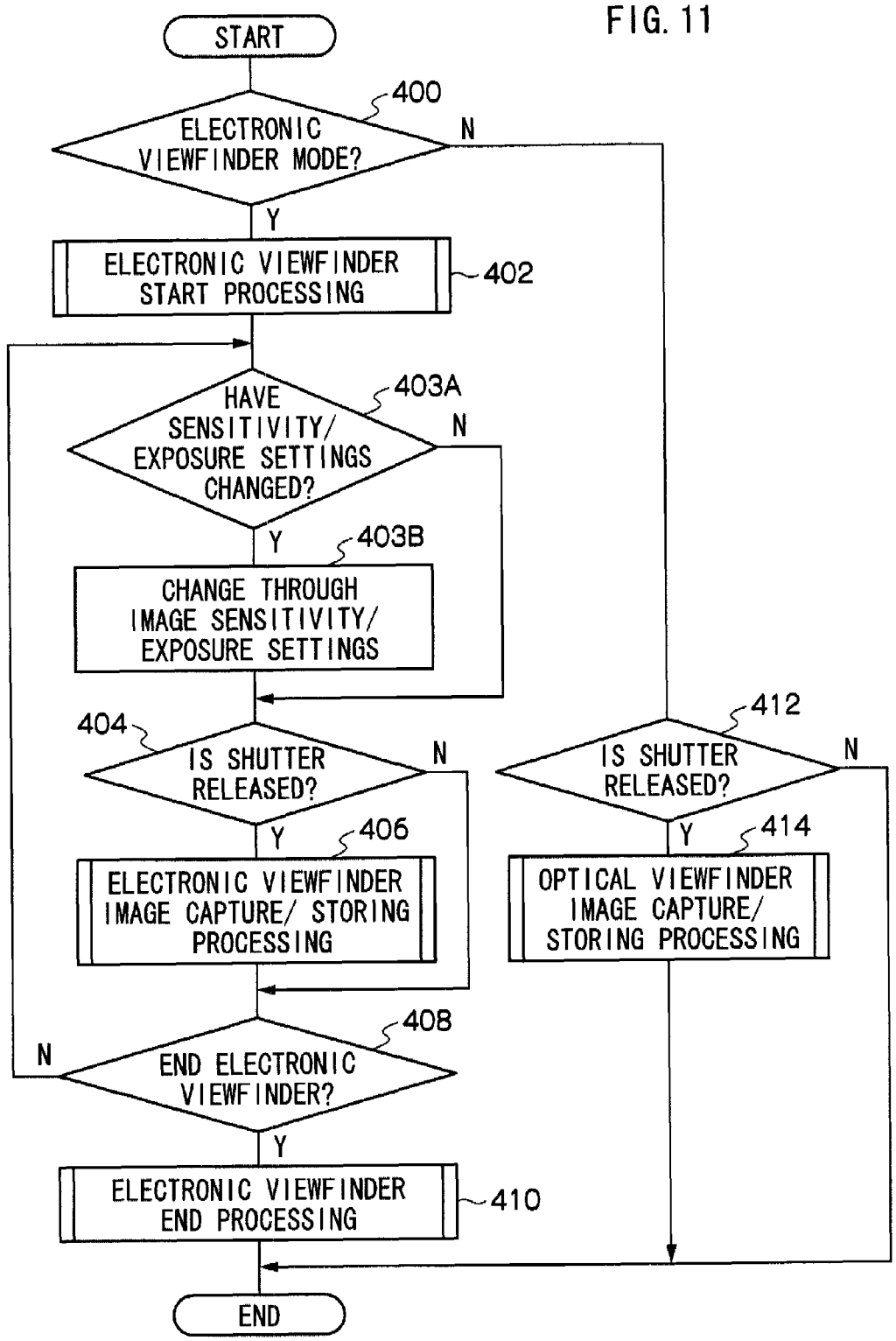
FIG. 11 is a flow chart of image capture processing according to a second exemplary embodiment.

A flow chart of image capture processing according to the second exemplary embodiment is shown in FIG. 11. The points therein that differ from those of the flow chart shown in FIG. 6 are only that the steps 403A, 403B have been added, and since other points are the same as those in FIG. 6, explanation thereof is omitted.

When the electronic viewfinder start processing is executed in step 402 of FIG. 11, the routine proceeds to step 403A.

In step 403A, determination is made as to whether or not the settings of the main image capture conditions relating to the sensitivity and exposure during main image capture have been changed by the user. When the main image capture conditions have been changed the routine proceeds to step 403B, and when the main image capture conditions are not changed the routine proceeds to step 404.

In step 404, in a similar manner to in step 420 of FIG. 7, the through image display conditions are set such that images are displayed on the liquid crystal monitor 64 that are equivalent to those during main image capture with the main image capture conditions.

In the present exemplary embodiment, as described above, when in the electronic viewfinder mode the settings of the main image capture conditions relating to sensitivity and exposure during main image capture have been changed by a user, the settings of the through image display conditions are corrected in real time so that images are displayed on the liquid crystal monitor 64 that are equivalent to those during main image capture with the changed main image capture conditions. Consequentially a user can confirm in advance with the liquid crystal monitor 64 an image of equivalent brightness and photographic subject field depth to that during main image capture, enabling good image capture of a photographic subject.

Third Exemplary Embodiment

Explanation will now be given of a third exemplary embodiment of the present invention. Explanation will be given relating to when light adjustment of the flash is appropriately performed in the third exemplary embodiment for main image capture with flash emission. Portions that are similar to the above exemplary embodiments are allocated the same reference numerals and detailed explanation thereof is omitted.

It is normal in flash image capture with an ordinary single lens reflex digital camera, as described above, for a pre-emission to be carried out, the light measured, followed by the main emission and image capture. However, as shown in FIG. 4, when in the electronic viewfinder mode light measurements cannot be made with the AE sensor 100 since the AE sensor 100 is provided on the optical viewfinder 60 side. Consequently in the present exemplary embodiment, luminance correction gain is computed based on image data from an image captured without flash emission and based on from image data of an image captured with a pre-emission, and the light emission amount set for during main light emission.

Figure 12:
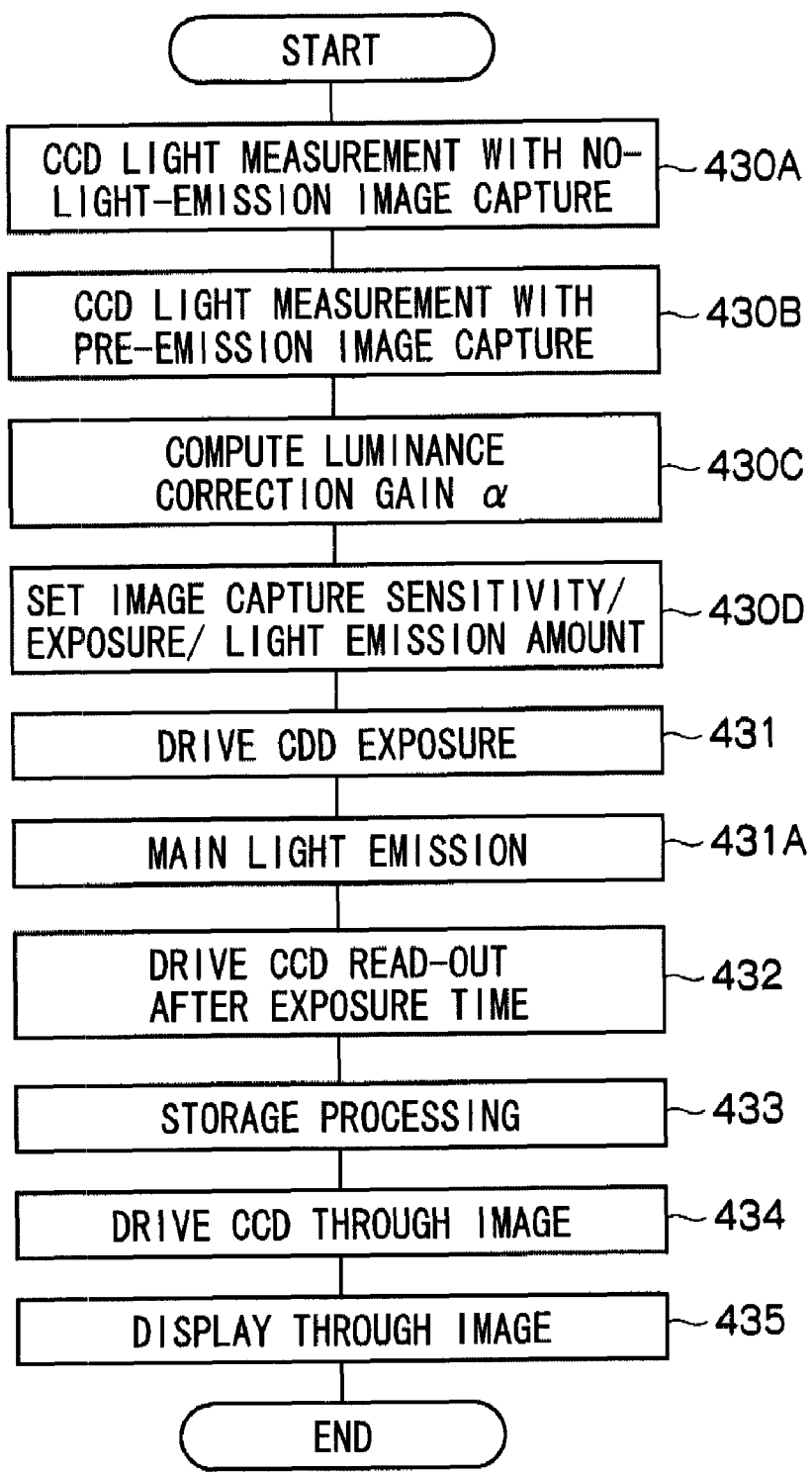
FIG. 12 is a flow chart of electronic viewfinder image capture/storing processing according to a third exemplary embodiment.
Figure 13:
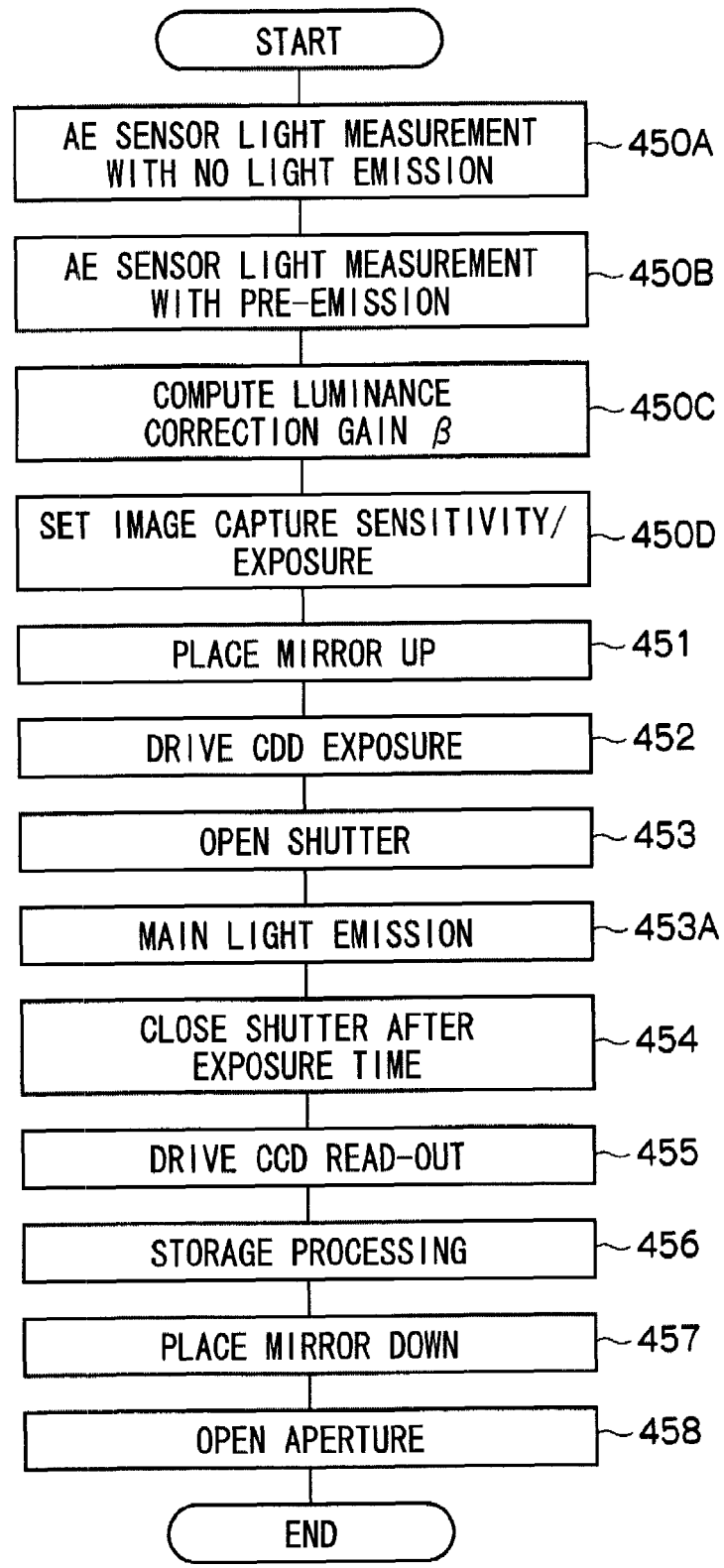
FIG. 13 is a flow chart of optical viewfinder image capture/storing processing according to the third exemplary embodiment.

In the present exemplary embodiment, only the electronic viewfinder image capture/storing processing of step 406 of FIG. 6, and the optical viewfinder image capture/storing processing of step 414 are different, with the electronic viewfinder image capture/storing processing and the optical viewfinder image capture/storing processing shown in FIG. 12 and FIG. 13 being executed in the present exemplary embodiment. Similar processing to that of FIG. 6 can be performed for other processing, however, the step 420 of FIG. 7 may be omitted with respect to the electronic viewfinder start processing of step 402.

The electronic viewfinder image capture/storing processing shown in FIG. 12 is different from the electronic viewfinder image capture/storing processing shown in FIG. 8 only with regard to the processing of steps 430A to 430D and 431A, and since other points are the same as the processing shown in FIG. 8 explanation thereof is omitted.

In step 430A, light measurement processing is performed without the flash 13 emitting light. In this light measurement processing, image capture processing is carried out with the set exposure conditions, and luminance level B1 of this image data is derived. The luminance level B1 can, for example, be derived as the average value of the luminance level for all of the pixels, however there is no limitation thereto. The luminance level may be derived by applying weightings in multiple patterns, and the luminance level of a particular portion may be derived using an image recognition technique.

In step 430B, light measurement processing is performed with the same exposure conditions as in step 430A, but with the flash 13 caused to emit a pre-emission with light emission amount G. This light measurement processing is conducted in a similar manner to in step 430A and derives a luminance level B2 of the image data from the image capture during pre-emission.

In step 430C, a luminance correction gain a for during main light emission is computed. Specifically, first a luminance increase component F is computed for the pre-emission according to the following formula.

$$F = B2 - B1 \quad (1)$$

The luminance correction gain a is then derived for a predetermined appropriate luminance level B according to the following formula.

$$\alpha = (B - B1)/F \quad (2)$$

Namely, the luminance correction gain α is a value for correcting the light emission amount of the flash emission such that the image during main image capture with flash emission is at the appropriate luminance level B.

In step 430D, the light emission amount is also set in addition to processing for setting the sensitivity and exposure conditions in a similar manner to in step 430 of FIG. 8. Namely, a main light emission amount G1 is computed such that the luminance increase component due to the flash becomes the α times the luminance correction gain with pre-emission computed in step 430C, and this amount is instructed to the flash control circuit 132.

The CCD 22 is then driven in step 431 in a similar manner to as in step 431 of FIG. 8, and flash emission is carried out with the set light emission amount G1 in step 431A.

Explanation will now be given of the optical viewfinder image capture/storing processing in the optical viewfinder mode shown in FIG. 13. The optical viewfinder image capture/storing processing in FIG. 13 differs only in steps 450A to 450D, and step 453A from the electronic viewfinder image capture/storing processing shown in FIG. 10, and since other elements of the processing are the same as those of FIG. 10 explanation thereof will be omitted.

In step 450A, a measured light level B1a is detected by light measurement using the AE sensor 100 without light emission from the flash 13.

In step 450B, a pre-emission is carried out with the flash 13 at the predetermined light emission amount G and light is measured with the AE sensor 100, and a measured light level B2a is detected.

In step 450C, a luminance correction gain β for during the main emission is computed. Specifically, first a luminance increase component Fa of the pre-emission is computed according to the following formula.

$$Fa = B2a - B1a \quad (3)$$

Next the luminance correction gain P is computed according to the following formula for a predetermined appropriate luminance level Ba.

$$\beta = (Ba - B1a)/Fa \quad (4)$$

Namely, the luminance correction gain β is a value for correcting the light emission amount for flash emission such that the appropriate luminance level Ba is reached during main image capture with flash emission.

In step 450D, the light emission amount is also set in addition to processing for setting the sensitivity and exposure conditions in a similar manner to in step 450 of FIG. 10. Namely, a main light emission amount G1a is computed such that the luminance increase component due to the flash becomes β times the luminance correction gain with pre-emission computed in step 450C, and this amount is instructed to the flash control circuit 132.

Then, in steps 451 to 453, similar processing to that in steps 451 to 453 of FIG. 10 is carried out, and in step 453A, flash emission is performed with the set light emission amount G1a.

The light correction gain is computed based on image data for images captured without flash emission and image data of images captured with pre-emission, and the light emission amount is set for the main emission in this manner in the electronic viewfinder mode in the present exemplary embodiment. Therefore, flash image capture can be carried out with an appropriate light emission amount in electronic viewfinder mode even with a configuration in which the AE sensor is provided in the vicinity of the optical viewfinder.

Fourth Exemplary Embodiment

Explanation will now be given of a fourth exemplary embodiment of the present invention. In the fourth exemplary embodiment, explanation will be given relating to a case when images equivalent to those of main image capture using flash emission are confirmed in advance during through image display in the electronic viewfinder mode. Portions the same as those of the above exemplary embodiments are allocated the same reference numerals and detailed explanation thereof is omitted.

Figure 14:
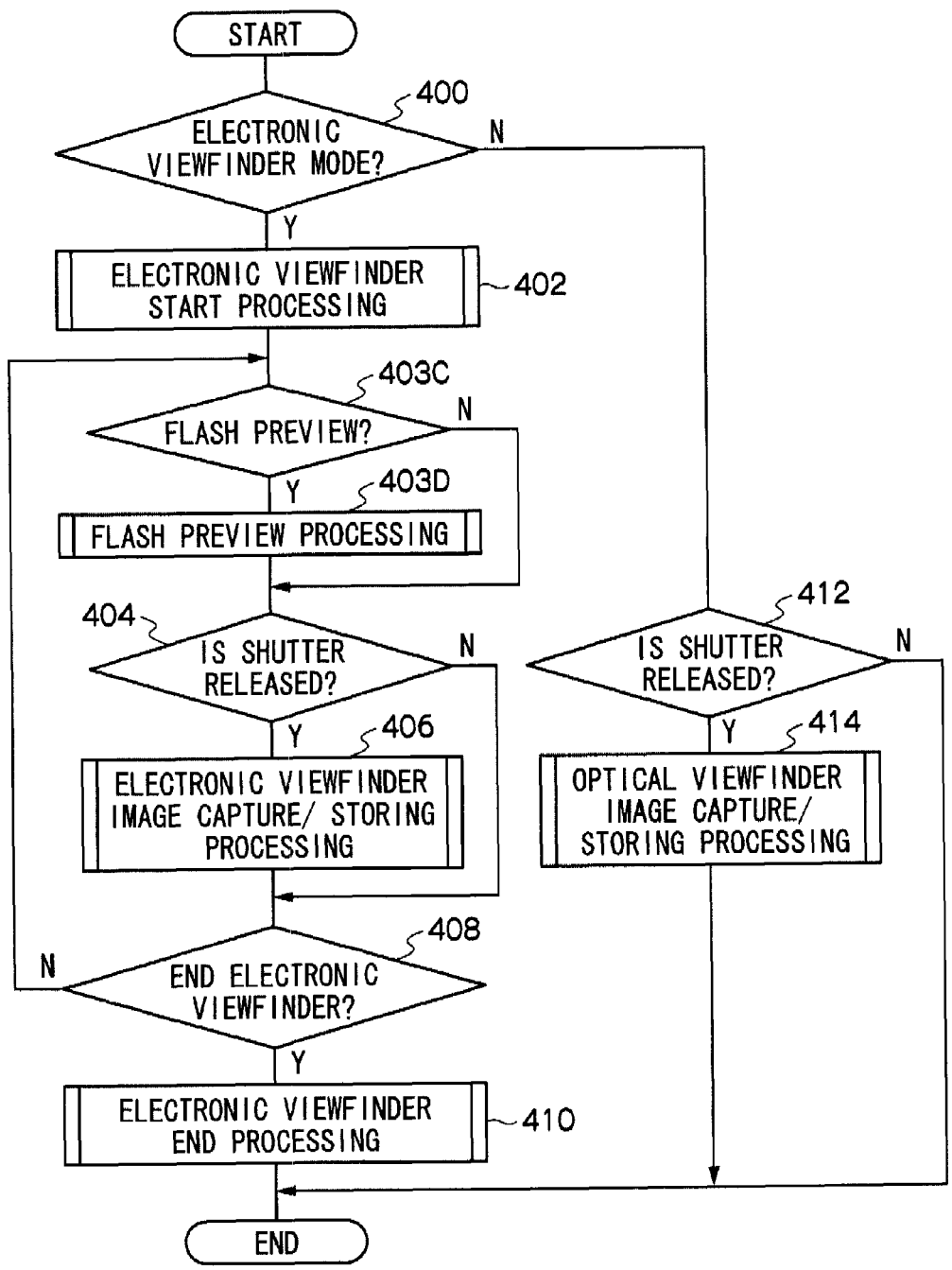
FIG. 14 is a flow chart of image capture processing according to a fourth exemplary embodiment.
Figure 16:
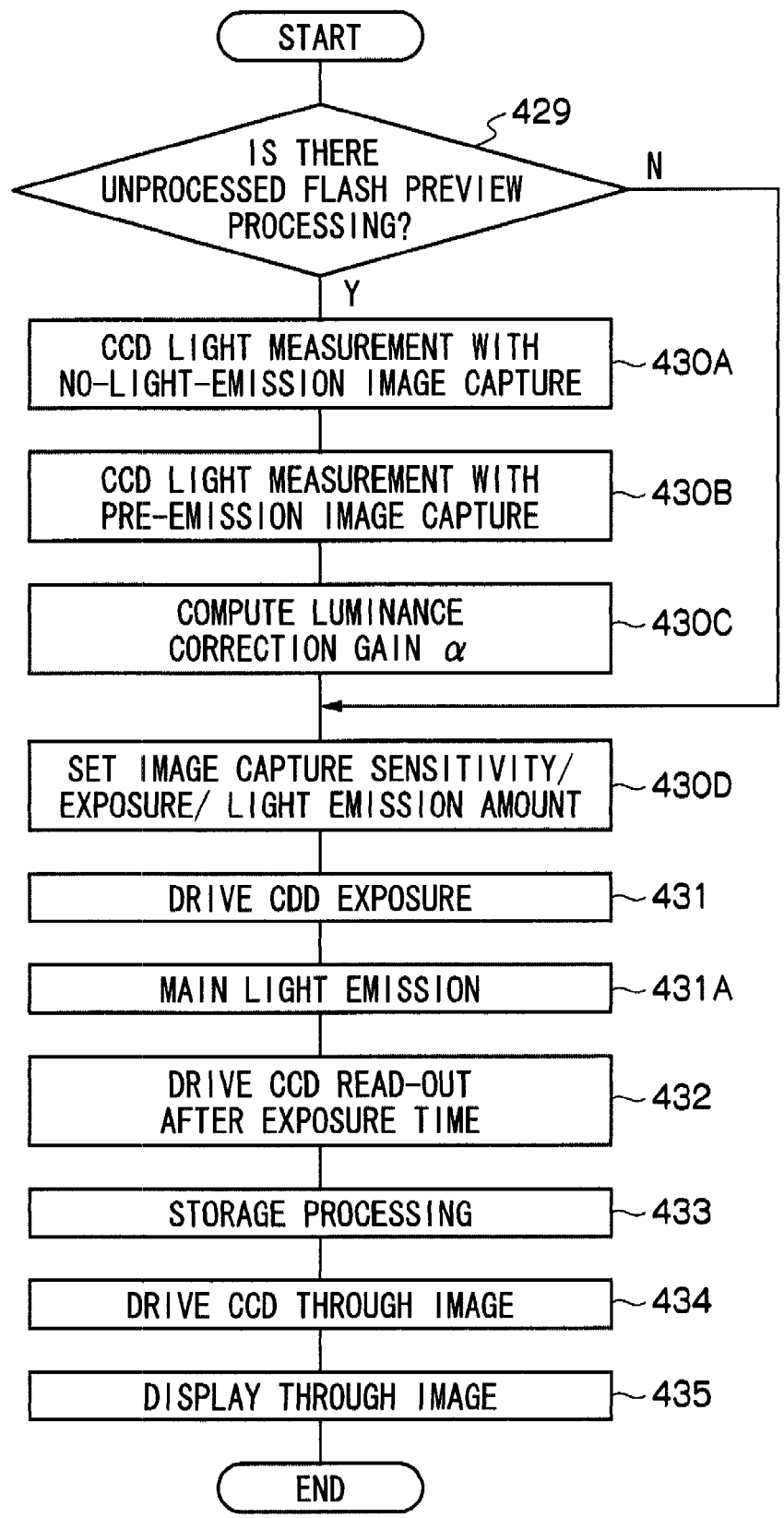
FIG. 16 is a flow chart of electronic viewfinder image capture/storing processing according to the fourth exemplary embodiment.

A flow chart of the image capture processing according to the present exemplary embodiment is shown in FIG. 14. The flow chart differs from the image capture processing shown in FIG. 6 only in that the steps 403C and 403D have been added, and in that the electronic viewfinder image capture/storing processing of step 406 is as shown in FIG. 16, other elements are the same as those of FIG. 6 and so explanation thereof is omitted.

When the electronic viewfinder start processing is executed in step 402 of FIG. 14, the routine proceeds to step 403C.

In step 403C, determination is made as to whether or not execution of flash preview has been instructed by a user. This flash preview is a function for displaying on the liquid crystal monitor 64 images equivalent to those during main image capture using flash emission. When execution of flash preview has been instructed the routine proceeds to step 403D, and when execution of flash preview is not instructed the routine proceeds to step 404.

Figure 15:
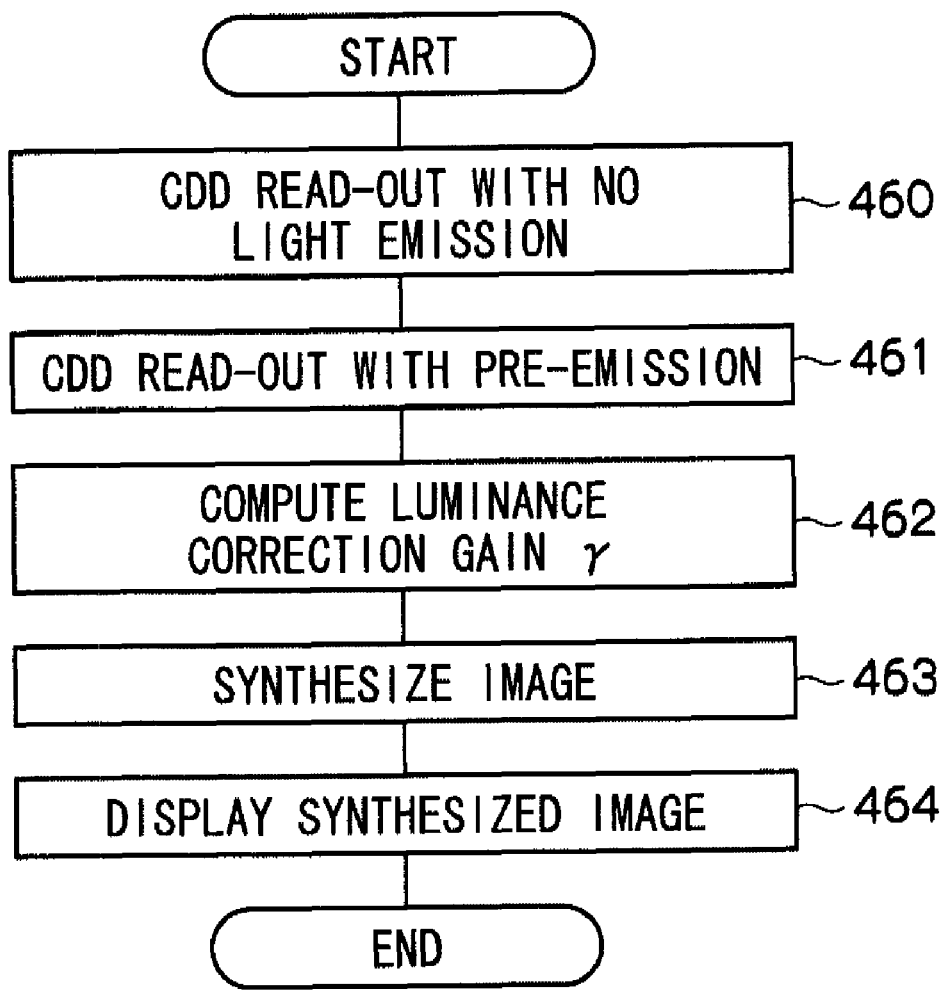
FIG. 15 is a flow chart of flash preview processing according to the fourth exemplary embodiment.

In step 403D, flash preview processing like that shown in FIG. 15 is executed. First in step 460 shown in FIG. 15, image capture processing is carried out without light emission of the flash 13 with the settings for the sensitivity and exposure set in advance by, for example, user operation, and this image data D1 is stored in the memory 110.

In step 461, image capture processing is carried out setting the same sensitivity and exposure as in step 160, and with pre-emission of the flash 13 with a predetermined light emission amount Gp, and this image data D2 is stored in the memory 110.

In step 462 a luminance correction gain γ is computed. Specifically, first the luminance levels B3, B4 are derived of image data D1, D2. The luminance levels B3, B4 can, for example, be average values of the luminance level across all the pixels, however there is no limitation thereto.

Next, a luminance increase component Fp due to emission of the flash 13 is computed according to the following formula.

$$Fp = B4 - B3 \quad (5)$$

Next, luminance correction gain γ is computed according to the next formula for a predetermined appropriate luminance level Bp.

$$\gamma = (Bp - B3)/Fp \quad (6)$$

In step 463, image data Dp for the preview image is computed according to the following formula.

$$Dp = D1 + \gamma \times (D2 - D1) \quad (7)$$

Namely, image data is synthesized by taking the image data D1 image captured without flash, and adding thereto difference data between the image data D2 image captured with flash emission and the image data D1 image captured with ordinary lighting, in other words image data representing only the light emission amount of the flash emission (D2−D1), multiplied by the luminance correction gain γ. The image data Dp arrived at is image data equivalent to that during main image capture with appropriate flash emission.

In step 464 a preview image (synthesized image) is displayed on the liquid crystal monitor 64 based on the computed image data Dp.

In this manner, images equivalent to those during main image capture with flash emission can be confirmed in advance in the electronic viewfinder mode, enabling good photographic subject image capture.

At step 406, when the flash preview processing is completed and it is determined at step 404 that shutter release has occurred, electronic viewfinder image capture/storing processing is executed as shown in FIG. 16.

Since the processing shown in FIG. 16, in comparison to the processing shown in FIG. 12, differs only in that the step 429 has been added, explanation of other processes is omitted.

In step 429, determination is made as to whether or not there is unprocessed flash preview processing, namely whether or not the processing of step 403D of FIG. 14 has already been executed. When there is unprocessed flash preview processing the routine proceeds to step 430A, and when there is no unprocessed flash preview processing the routine proceeds to step 430D.

Namely, when there is already no unprocessed flash preview processing, transition is quickly made to image capture processing with main light emission since the luminance correction gain γ has already been computed. However, when there is unprocessed flash preview processing then processing the same as that of steps 430A to 430C described above is executed, the luminance correction gain γ is computed and image capture processing is carried out with main light emission.

In this manner, in the electronic viewfinder mode of the present exemplary embodiment images equivalent to those during main image capture with flash light emission can be confirmed in advance, therefore enabling good image capture of a photographic subject. In addition fast transition can also be made to image capture processing with main light emission after flash preview processing has been carried out once.

Fifth Exemplary Embodiment

Explanation will now be given of a fifth exemplary embodiment of the present invention. Explanation will be given of a case where the sensitivity and exposure settings have been changed by operation by a user during flash preview in the electronic viewfinder mode of the fifth exemplary embodiment. Portions that are the same as those of the above exemplary embodiments are allocated the same reference numerals and detailed explanation thereof is omitted.

Figure 17:
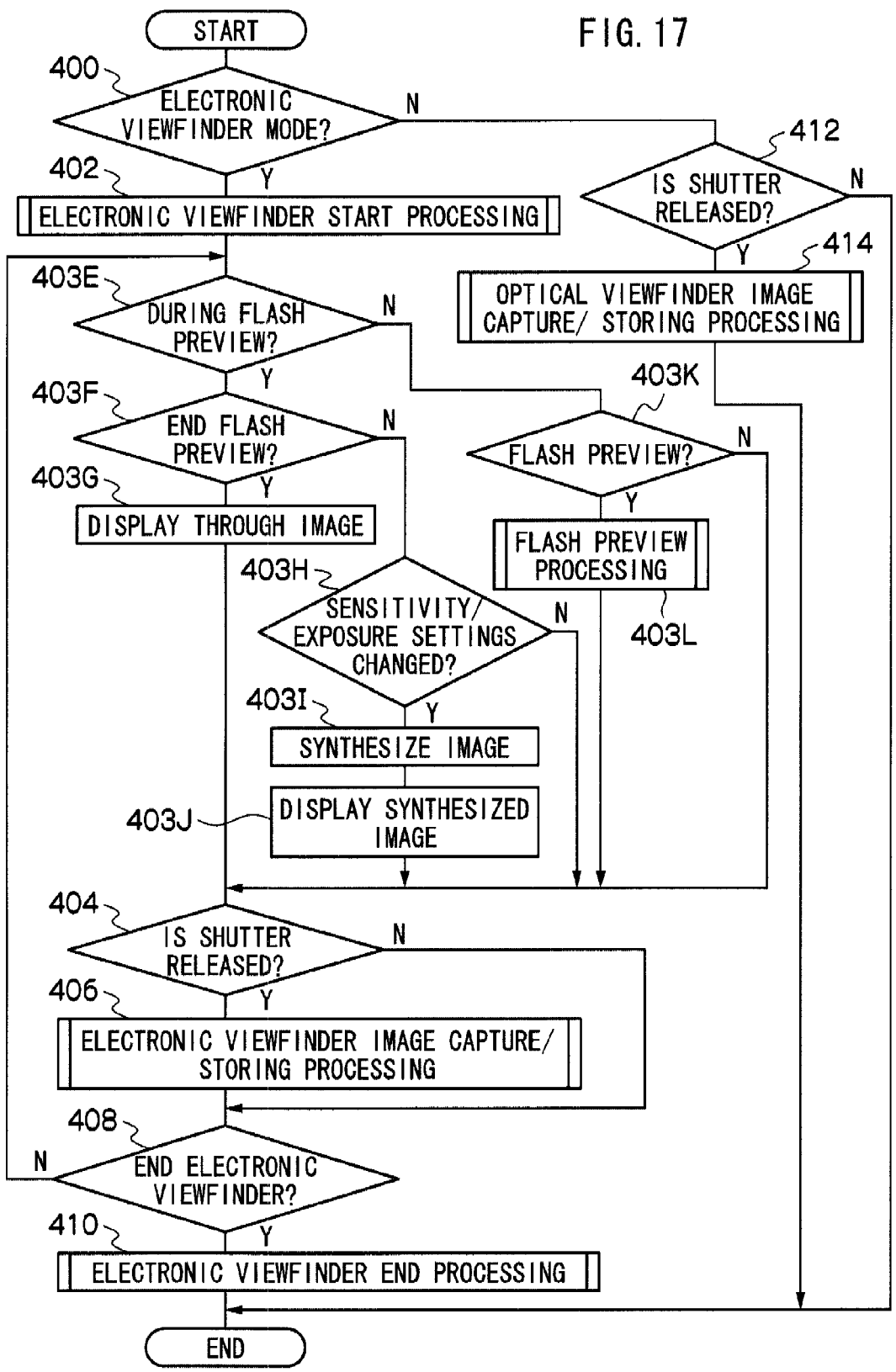
FIG. 17 is a flow chart of image capture processing according to a fifth exemplary embodiment.

A flow chart of the image capture processing according to the present exemplary embodiment is shown in FIG. 17. The differences therefrom to the image capture processing shown in FIG. 6 is that the steps 403E to 403L have been added, and the electronic viewfinder image capture/storing processing of step 406 is as shown in FIG. 12. Since other elements are the same as in FIG. 6 explanation thereof will be omitted.

When the electronic viewfinder start processing at step 402 of FIG. 17 is executed, the routine proceeds to step 403E.

In step 403E determination is made as to whether or not flash preview is in process. When flash preview is in process the routine proceeds to step 403F, and when flash preview is not in process the routine proceeds to step 403K. Since the processing of step 403K is the same as that of step 403C shown in FIG. 14, and the processing of step 403L is the same as that of step 403D shown in FIG. 14 explanation thereof is omitted.

At step 403F, determination is made as to whether or not to end flash preview, and when flash preview is to be ended the routine proceeds to step 403G, and a switch to through image display is made.

However, when the flash preview is not to be ended the routine proceeds to step 403H, and determination is made as to whether or not the main image capture conditions relating to the sensitivity, exposure and light emission amount during main image capture have been changed by operation by a user. When the main image capture conditions have been changed the routine proceeds to step 403I, and when the main image capture conditions have not been changed the routine proceeds to step 404.

In step 403I, image data Dp of the preview image is computed according to the following formula.

$$Dp = \delta \times D1 + \gamma \times (D2 - D1) \quad (8)$$

Here, δ is a parameter for adjusting the brightness of image data D1, with a default value of 1. Namely, when there are no main image capture conditions set the above formula (8) is the same as the above formula (7).

δ and γ are adjusted according to the changed main image capture conditions. For example, when the setting for the light emission amount has been changed, only the luminance correction gain γ is changed, since the light emission amount only affects the flash emission. Specifically, adjustment is carried out such that the value of γ is made smaller when the setting has been changed so that the light emission amount is reduced, and the value of γ is made larger when the setting has been changed so that the light emission amount is increased.

Also, when the setting of the shutter speed has been changed the luminance correction gain γ is not adjusted and only the parameter δ is adjusted, since the duration of flash emission is extremely short, and within a range where the shutter speed is longer than the flash emission duration the influence on luminance correction gain γ can be ignored. Specifically, adjustment is made to the value of δ such that δ is made smaller when the settings have changed such that the shutter speed is faster, and δ is made larger when the settings have been changed such that the shutter speed is slower.

Also, when changes to the setting of the aperture number and/or sensitivity have been changed both δ and γ are adjusted, since there is an effect on both image data D1 with ambient lighting and image data D2 with flash emission. Specifically, the values of δ and γ are adjusted such that the values of δ and γ are made larger when the settings are changed to change the aperture number in the aperture opening direction, and the values of δ and γ are made smaller when the settings are changed to change the aperture number in the aperture closing direction. In addition, the values of δ and γ are adjusted such that the values of δ and γ are made larger when settings are changed so that the sensitivity is increased, and the values of δ and γ are adjusted such that the values of δ and γ are made smaller when settings are changed so that the sensitivity is decreased.

In step 403J, a preview image (synthesized image) is displayed on the liquid crystal monitor 64 based on the computed image data Dp.

In this manner, correction of images for flash image capture can be made in real time by appropriately adjusting vales of δ and γ for generating the preview image according to the changed main image capture conditions, even when the main image capture conditions are changed during flash preview, enabling images for flash image capture to always be confirmed in advance.

Sixth Exemplary Embodiment

Explanation will now be given of a sixth exemplary embodiment of the present invention. Explanation will be given relating to a case where override-switching is made to manual focus mode when the auto focus mode is set with the electronic viewfinder mode selected. Portions the same as those of the above exemplary embodiments are allocated the same reference numerals, and detailed explanation thereof is therefore omitted.

Figure 18:
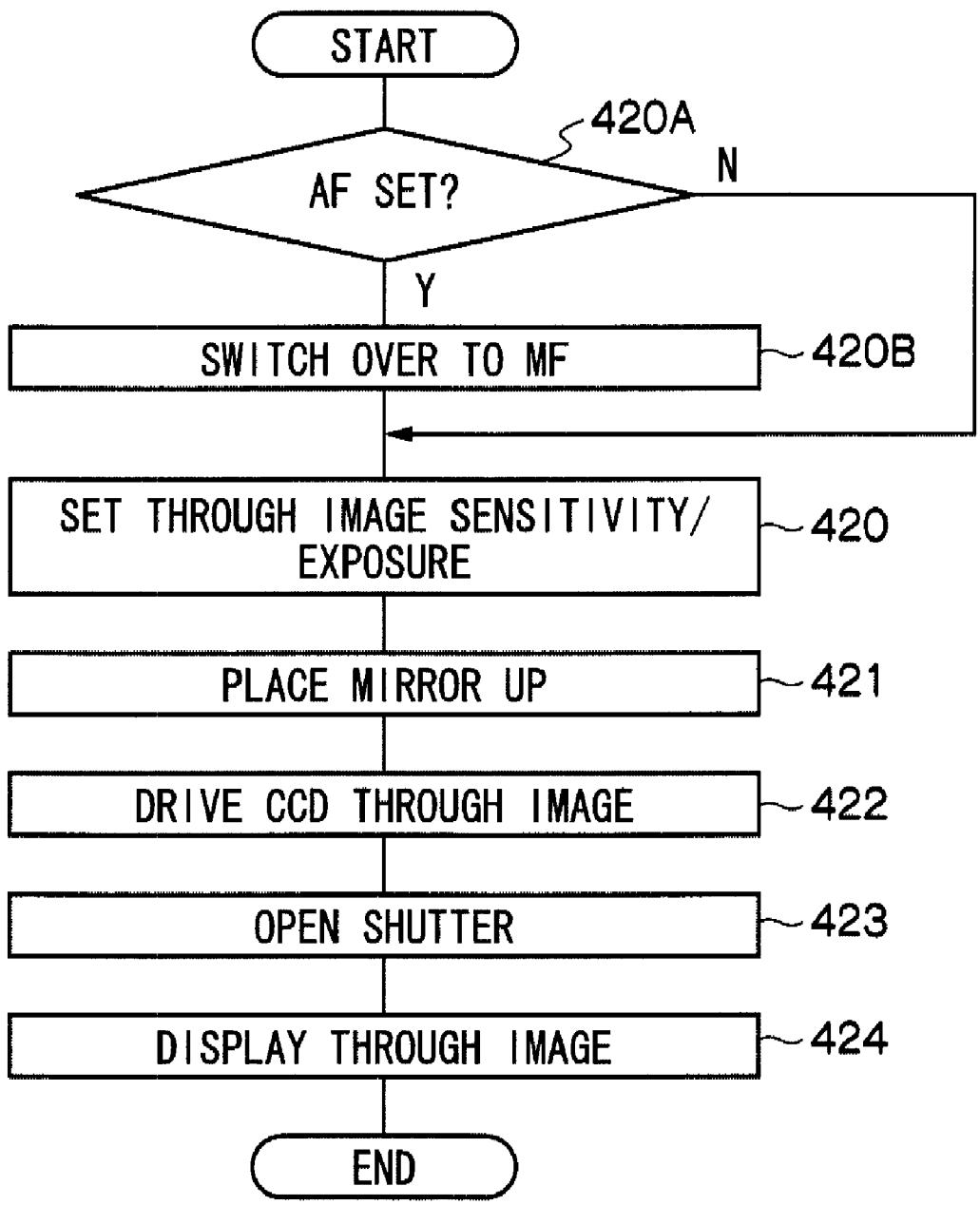
FIG. 18 is a flow chart of electronic viewfinder start processing according to a sixth exemplary embodiment.
Figure 19:
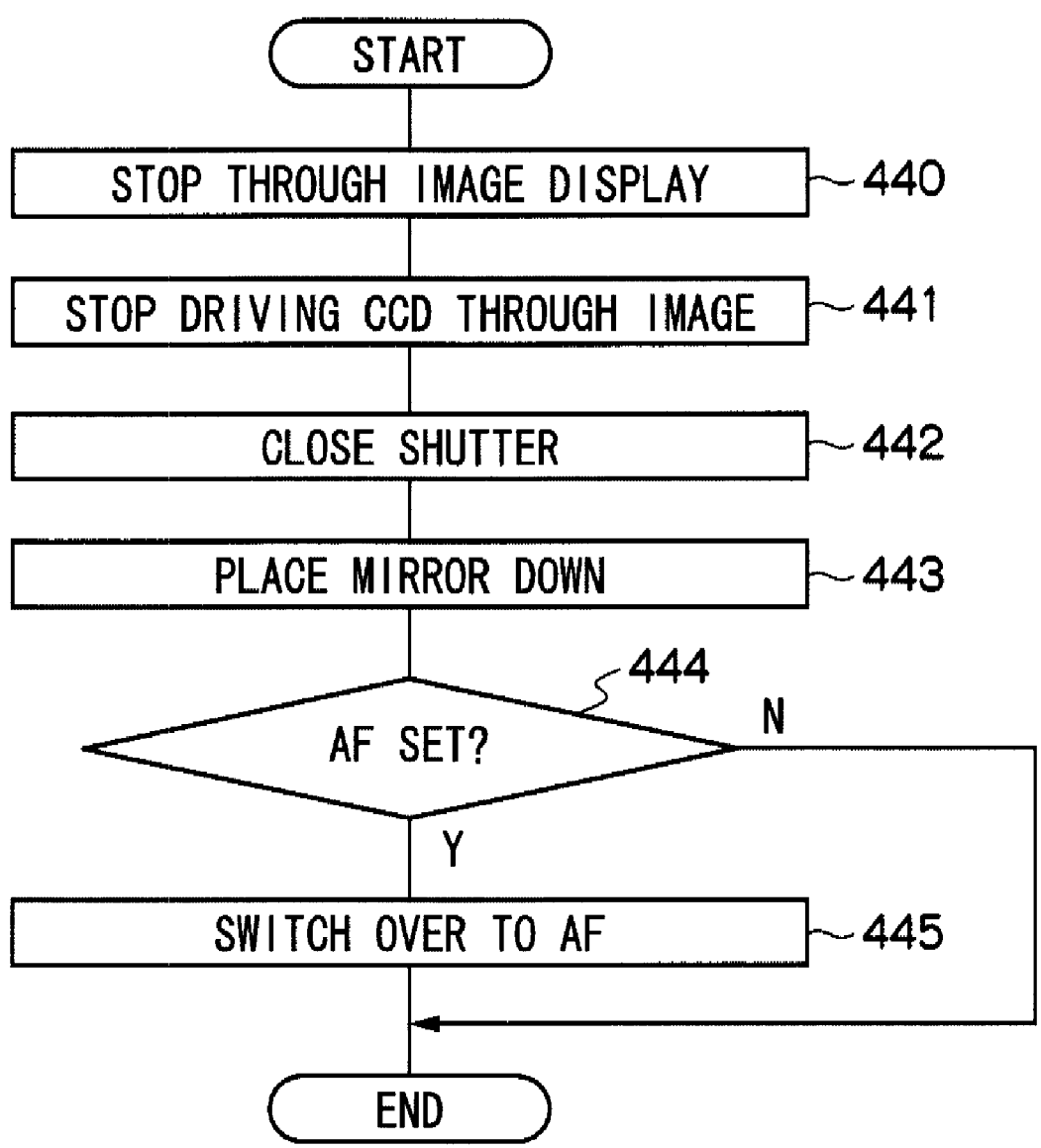
FIG. 19 is a flow chart of electronic viewfinder end processing according to the sixth exemplary embodiment.

The image capture processing of the present exemplary embodiment differs from that of the image capture processing shown in FIG. 6 only in that the electronic viewfinder start processing of step 402 is processing as shown in FIG. 18 and the electronic viewfinder end processing of step 410 is processing as shown in FIG. 19. Other processing is the same as that of FIG. 6 and so explanation thereof will be omitted.

In step 420A shown in FIG. 18, determination is made as to whether or not the autofocus mode is set, i.e. whether or not the AF/MF changeover switch 130 is set to the AF side thereof. When the autofocus mode is set the routine proceeds to step 420B, and when the autofocus mode is not set the routine proceeds to step 420. Step 420 to step 424 are the same as those of FIG. 7 and explanation thereof is omitted.

In step 420B, override-switching to the manual focus mode is made even when the AF/MF changeover switch 130 is set to the AF side. Methods for switching to manual focus mode include releasing the gears in the AF driving mechanism and enabling manual operation of the focus ring to drive the focusing lens, and detecting the focus ring and activating focusing lens driving according to the detection result.

Fine adjustment of focusing is conventionally difficult in auto focus of the optical viewfinder mode, and when fine adjustment of focus is required in the electronic viewfinder mode it was necessary to manually operate the AF/MF changeover switch to switch to the manual focus mode in order to adjust the focus. However, in the present exemplary embodiment, there is no need for a user to manually switch over to the manual focus mode since automatic switching to the manual focus mode is made in the electronic viewfinder mode, enabling the ease of use to be improved.

Explanation will now be given of the electronic viewfinder end processing.

The processing of steps 440 to 443 in the electronic viewfinder end processing shown in FIG. 19 is the same as the processing shown in FIG. 9 and so explanation thereof is omitted.

In step 443 the quick return mirror 203 is placed mirror down, and in step 444 determination is made as to whether or not the original setting was for the auto focus mode. When the auto focus mode was set then switching is made from the manual focus mode back to the auto focus mode at step 445, since override-switching to the manual focus mode had been made in the electronic viewfinder start processing. However, when the autofocus mode was not set, the current routine is ended since the original manual focus mode is now set.

In the present exemplary embodiment, ease of use for a user can be improved, since when the auto focus mode is set in the electronic viewfinder mode switching is made by override to the manual focus mode, and the mode is automatically returned in the above manner from the manual focus mode to auto focus mode when electronic viewfinder mode is ended.

The present invention is also not limited to the above described exemplary embodiments, and obviously modifications and changes may be suitably applied to the design within the scope of the recited claims. Processing is also executable with combinations of the exemplary embodiments described above.

What is claimed is:

1. An image capture device comprising:
an optical viewfinder that optically displays incident light from a photographic subject;
an image capture element that captures an image of the photographic subject;
an image capture optical system that focuses the light from the photographic subject onto the image capture element;
a reflection mirror that is provided between the image capture element and the image capture optical system and that directs the light from the photographic subject to either the optical viewfinder or the image capture element;
a display unit that displays the image captured on the image capture element;
an image capture mode switching section that switches between an optical viewfinder mode with photographic subject confirmation with the optical viewfinder and image capture, and an electronic viewfinder mode with photographic subject with a through image displayed on the display unit and image capture;
a control unit that, when the electronic viewfinder mode is set, drives the reflection mirror so that light from the photographic subject is directed onto the image capture element and so that the image captured on the image capture element is displayed on the display unit at a specific interval of time as the through image; and
an adjustment unit that adjusts, according to the image capture conditions during through image display, at least one of the through image display conditions during through image display and/or the main image capture conditions during main image capture,
wherein, when a shutter speed during main image capture is shorter than a periodicity of through image read-out, the sensitivity, aperture number and shutter speed of the through image are the same as the sensitivity, aperture number and shutter speed during main image capture, and wherein, when the shutter speed during main image capture is slower than the periodicity of through image read-out, then the sensitivity is set by adding in the difference of the through image read-out periodicity subtracted from the shutter speed during main image capture, that is adding in a shortfall to the shutter speed.

2. The image capture device of claim 1, wherein the adjustment unit adjusts the through image display conditions according to changed main image capture conditions when the main image capture conditions have been changed.

3. The image capture device of claim 1, further comprising a flash emission unit that emits light toward the photographic subject.

4. The image capture device of claim 3, wherein, when main image capture is instructed during through image display, the adjustment unit adjusts the light emission amount during main light emission of the flash emission unit based on image data captured without light emission by the flash emission unit and based on image data captured with pre-emission light emission by the flash emission unit.

5. The image capture device of claim 3, wherein the adjustment unit comprises a generation unit that generates an equivalent image equivalent to an image captured with the flash emission unit emitting light in main image capture.

6. The image capture device of claim 5, wherein the generation unit generates the equivalent image based on image data captured without light emission by the flash emission unit with the main image capture conditions and based on image data captured during pre-emission light emission by the flash emission unit with the main image capture conditions.

7. The image capture device of claim 5, wherein when the main image capture conditions have been changed the generation unit regenerates the equivalent image according to the changed main image capture conditions.

8. The image capture device of claim 6, wherein when the main image capture conditions have been changed the generation unit regenerates the equivalent image according to the changed main image capture conditions.

9. The image capture device of claim 1, further comprising:
a focusing mode switching unit that switches between an auto focus mode in which focusing of the photographic subject is carried out automatically and a manual focus mode in which focusing of the photographic subject is carried out manually, wherein
when the electronic viewfinder mode is set the control unit override-switches to the manual focus mode.

10. The image capture device of claim 1,
wherein, when $Tv \leq Tv\_c$, the shutter speed during main image capture being shorter than the periodicity of through image read-out, the through image sensitivity, aperture number and shutter speed are set as follows:

$$Sv\_m = Sv, Av\_m = Av, \text{ and } Tv\_m = Tv$$

where the image capture sensitivity during main image capture is Sv; the aperture number during main image capture is Av; the shutter speed during main image capture is Tv;
the sensitivity of the through image is $Sv\_m$; the aperture number of the through image is $Av\_m$;
the exposure duration of the through image is $Tv\_m$; and the periodicity of read-out of the through image is $Tv\_c$, and
wherein, when $Tv > Tv\_c$, the shutter speed during main image capture being slower than the periodicity of through image read-out, the sensitivity, aperture number and shutter speed of the through image are set as follows:

$$Sv\_m = Sv + (Tv - Tv\_c), Av\_m = Av, Tv\_m = Tv\_c.$$

* * * * *